(12) United States Patent
Kato

(10) Patent No.: US 6,335,994 B1
(45) Date of Patent: Jan. 1, 2002

(54) WAVEGUIDE ELEMENT, WAVEGUIDE BRANCH OR COUPLER ELEMENT AND WAVEGUIDE INTERGRATED CIRCUIT

(75) Inventor: Tomoaki Kato, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/082,799

(22) Filed: May 21, 1998

(30) Foreign Application Priority Data

May 21, 1997 (JP) ............................................. 9-130209

(51) Int. Cl.[7] .............................. G02B 6/26; G02B 6/42
(52) U.S. Cl. ............................ 385/50; 385/32; 385/40; 385/41; 385/44; 385/45
(58) Field of Search ............................. 385/50, 44, 45, 385/32, 41, 40, 14, 39

(56) References Cited

U.S. PATENT DOCUMENTS

| | | | | |
|---|---|---|---|---|
| 3,753,157 A | * | 8/1973 | Ash | 385/50 |
| 4,087,159 A | * | 5/1978 | Ulrich | 385/129 |
| 4,988,156 A | | 1/1991 | Shigihara | |
| 5,349,602 A | * | 9/1994 | Mehuys | 372/98 |

FOREIGN PATENT DOCUMENTS

| | | | |
|---|---|---|---|
| JP | 57-19402 | | 4/1982 |
| JP | 62-62304 | | 3/1987 |
| JP | 62-258407 | | 11/1987 |
| JP | 63-19620 | | 1/1988 |
| JP | 63-217330 | | 9/1988 |
| JP | 64-62602 | | 3/1989 |
| JP | 57-19402 | * | 4/1992 |
| JP | 5-173030 | | 7/1993 |

OTHER PUBLICATIONS

Saleh, "Fundamentals of photonics", Wiley, p. 252, Jan. 1991.*
Michael W. Austin, "GaAs/GaAlAs Curved Rib Waveguides", *IEEE Transactions on Microwave Theory and Techniques*, vol. MTT–30, No. 4, Apr. 1982, pp. 641–645.
R. Baets et al., "Calculation of radiation loss in integrated–optic tapers and Y–junctions", *Applied Optics*, vol. 21, No. 11, Jun. 1, 1982, pp. 1972–1978.
Akira Mugino et al., "InP/InGaAsP Semiconductor Corner Waveguide", 1994 Autumn Conference of the Institute for Electronics, Information and Communication Engineers, 1994, p. 184.

* cited by examiner

*Primary Examiner*—Darren Schuberg
*Assistant Examiner*—Leo Boutsikaris
(74) *Attorney, Agent, or Firm*—Sughrue Mion, PLLC

(57) ABSTRACT

A waveguide element is capable of realizing acute waveguide discontinuity, such as a right angle bending, (L-shaped bending) or branching (T-shaped branching). Two single mode waveguides having the identical cross-sectional structure form a waveguide discontinuity where center axes thereof extending in the longitudinal direction intersect with each other at an angle $\theta$ ($0<\theta<90°$). A leaky wave propagation region in a form of a quadrilateral shape having a length of one edge of L is located in the vicinity of a point where the center axes extended in the longitudinal directions of respective incident side and side single mode waveguides, with an effective propagation wavelength of a dominant mode there of to be $\cos(\theta/2)$ times of an effective propagation wavelength $\lambda G$. Thus, an energy of the wave launched from an incident end of the single mode waveguide can be efficiently taken out from a end of the single mode waveguide.

78 Claims, 11 Drawing Sheets

WAVEGUIDE ELEMENT, WAVEGUIDE BRANCH OR COUPLER ELEMENT AND WAVEGUIDE INTERGRATED CIRCUIT

BACKGROUND OF THE INVENTION

1. Field of the Invention

The present invention relates generally to a waveguide element, a waveguide branch or coupler element and a waveguide integrated circuit. More specifically, the invention relates to a waveguide discontinuity, an extremely high frequency wave integrated circuit, an optical integrated circuit, a quantum electronic device or so forth using the waveguide discontinuity.

2. Description of the Related Art

Associating with increasing optical elements or increasing of kinds of the optical elements to be employed in an optical communication system, cost and mounting load for overall system is becoming significant. In such circumstance, necessity for optical integrated circuit [PIC (Photonic Integrated Circuit)], on which a plurality of optical elements are integrated on a single substrate in monolithic manner, for realizing a specific finction, has been put forward.

On the other hand, for the purpose of extreme enhancement of electronic circuit element, development and research has been started for a quantum electronic device seeking for new possibility of quantum effect as a wave of electron (de Broglie wave) employing a nanometer class fine fabricating technology.

In such element, function of a branch or coupler for coupling between respective functional elements becomes more important, as well as enhancement of performance of respective of individual functional elements. Particularly, for realizing higher two-dimensional package density, acute waveguide discontinuous element, such as a right angle bending (L-shaped bending) or a branching (T-shaped branching) is inherent for enhancing freedom in layout of respective functional elements to be comparable with an electrical integrated circuit.

However, in order to strictly analyze behavior of electron or so forth in a fine structure of extremely high frequency wave, a submillimeter wave and further nanometer class, it is necessary to handle these as a wave. Naturally, it is inevitable to cause reflection and radiation to be a primary cause of bending of the waveguide or loss in discontinuity.

As a known technology for restricting excessive loss in acute waveguide discontinuity, a tapered structure gradually deforng cross-sectional shape of the waveguide over a sufficiently long region in comparison with a wavelength, has been widely employed. However, this inherently increases the overall length of the waveguide integrated circuit. As a result, various problems to overcome, in constrainint layout freedom of respective elements, lowering of yield percenteedegration degree, increasing of absorption loss, have been encountered.

In order to arbitrarily bend propagating direction of a light beam, it is a typical method to employ a mirror (reflection mirror). A typical waveguide bending element widely studied for the purpose of application to optical integrated circuit or so forth, is a corner reflector.

In the foregoing conventional optical integrated circuit, the acute waveguide discontinuous element, such as right angle bending (L-shaped bend)or branching (T-shaped branch) is inherent for enhancing freedom in layout of respective functional elements to be comparable with an electrical integrated circuit.

While the reflection mirror is employed for bending propagating direction of the light beam at an arbitrary angle, the mirror functions as an ideal reflecting plane only when it is sufficiently larger than the wavelength of a beam form wave propagating in a multi-mode space. In other words, the mirror of the size substantially equal to the wavelength or smaller merely serves as scattering body arranged on a path, for the wave.

The corner reflector as the waveguide bending element does not effectively achieve function as a pure reflection mirror as long as it is mounted in a single mode waveguide. The reason why the corner reflector appears to behave for being the path of the light is that the single mode waveguide on the output side picking up a diffracted wave generated by scattering by the cornering reflector barely encloses the diffracted wave in lateral direction (direction perpendicular to a propagation axis).

As set forth above, as the structure for realizing acute waveguide discontinuity in the optical integrated circuit, the structure which is applicable for practical use, is not present.

SUMMARY OF THE INVENTION

The present invention has been worked out for solving the problems set forth above. Therefore, it is an object of the present invention to provide a waveguide element, a waveguide branch or coupler element and a waveguide integrated circuit, which can realize acute waveguide discontinuity, such as a right angle bending (L-shaped bending) or branching (T-shaped branching).

According to the first aspect of the present invention, a waveguide element having a waveguide discontinuity including at least one of bending and intersection of straight waveguide propagating a wave, comprises:

first and second straight waveguides forming at least one of bending and intersection; and a leaky wave propagation region establishing a leaky wave coupling of the wave propagating through said first and second straight waveguides at substantially equal rate.

According to the second aspect of the present invention, a waveguide branch or coupler element having a waveguide discontinuity including at least one of bending and intersection of straight waveguides propagating a wave for branch or couplersaid wave, comprises:

first, second and third straight waveguide forming at least one of said bending and intersection;

a first leaky wave propagation region establishing a leaky wave coupling of said wave propagating through respective of said first and second straight waveguides at substantially the same rate; and a second leaky wave propagation region establishing a leaky wave coupling of said wave propagating through respective of said first and third straight waveguides at substantially the same rate.

According to the third aspect of the present invention, a waveguide integrated circuit, in which a waveguide element having a waveguide discontinuity including at least one of a bending and an intersection of straight waveguide propagating a wave, is integrated on a substrate, comprises:

first and second straight waveguides forming at least one of bending and intersection; and a leaky wave propagation region establishing a leaky wave coupling of the wave propagating through said first and second straight waveguides at substantially equal rate.

An object of the present invention is to realize an acute waveguide discontinuity by restricting an excessive loss caused by reflection or radiation of wave in the waveguide bending or intersecting the straight waveguides propagating a general wave including an electromagnetic wave, such as an extremely high frequency wave, a light and the like or a de Broglie wave of electron or the like.

The waveguide element includes two single mode waveguides have center axes extending in longitudinal directions and intersecting at an intersection angle $\theta$ ($0<\theta\leq 90°$) and have effective propagation wavelength $\lambda G$, and a leaky wave propagation region is a region of effective propagation wavelength $\lambda L$ having two edges located close to each other along the longitudinal direction of respective of two single mode waveguides so as to establish leaky wave coupling of the wave propagating through the single mode waveguides at substantially the same rate.

The two single mode waveguides and said leaky wave propagation region are single mode in the direction perpendicular to the plane including two single mode waveguides and in symmetric relationship with respect to a particular plane perpendicular to a plane including two single mode waveguides and including a straight line equally dividing a supplementary angle ($\pi-\theta$) of an intersecting angle $\theta$ ($0<\theta\leq 90°$) of the two single mode waveguides.

A relationship expressed by:

$$\cos(\theta/2) \approx \lambda L/\lambda G$$

is substantially established to make various amounts of the effective propagation wavelength $\lambda G$ and the effective propagation wavelength $\lambda L$ to be sufficiently small, and two single mode waveguides are coupled via the leaky wave propagation region.

An object of the present invention is to provide a waveguide branch or coupler element, which realizes an acute waveguide discontinuity by restricting an excessive loss caused by reflection or radiation of wave in the-waveguide bending or intersecting the straight waveguides propagating a general wave including an electromagnetic wave, such as an extremely high frequency wave, a light and the like or a de Broglie wave of electron or the like.

The waveguide branch or coupler element includes first single mode waveguide of effective propagation wavelength of $\lambda G$, second and third single mode waveguides of effective propagation wavelength of $\lambda G$ which intersect first single mode waveguide at an intersection angle $\theta$ ($0<\theta\leq 90°$), and first and second leaky wave propagation region of effective propagation wavelength of $\lambda L$.

These are single modes in perpendicular direction including a plane including first and second single mode waveguides and are in symmetric relationship with respect to a particular plane perpendicular to a plane including said first and second single mode waveguides and including a straight line equally dividing a supplementary angle ($\pi-\theta$) of an intersecting angle $\theta$ ($0<\theta\leq 90°$) of said first and second single mode waveguides.

A relationship expressed by:

$$\cos(\theta/2) = \lambda L/\lambda G$$

is substantially established, the first and second single mode waveguides are mutually coupled via the first leaky wave propagation region, and similarly, the first and third single mode waveguides are mutually coupled via the second leaky wave propagation region.

An object of the present invention is to provide a waveguide integrated circuit, in which the waveguide element realizing an acute waveguide discontinuity by restricting an excessive loss caused by reflection or radiation of wave in the waveguide bending or intersecting the straight waveguides propagating a general wave including an electromagnetic wave, such as an extremely high frequency wave, a light and the like or a de Broglie wave of electron or the like, is integrated on the substrate.

The waveguide element includes two single mode waveguides have center axes extending in longitudinal directions and intersecting at an intersection angle $\theta$ ($0<\theta\leq 90°$) and have effective propagation wavelength $\lambda G$, and a leaky wave propagation region is a region of effective propagation wavelength $\lambda L$ having two edges located close to each other along the longitudinal direction of respective of two single mode waveguides so as to establish leaky wave coupling of the wave propagating through the single mode waveguides at substantially the same rate.

The two single mode waveguides and said leaky wave propagation region are single mode in the direction perpendicular to the plane including two single mode waveguides and in symmetric relationship with respect to a particular plane perpendicular to a plane including two single mode waveguides and including a straight line equally dividing a supplementary angle ($\pi-\theta$) of an intersecting angle $\theta$ ($0<\theta\leq 90°$) of the two single mode waveguides.

A relationship expressed by:

$$\cos(\theta/2) \approx \lambda L/\lambda G$$

is substantially established to make various amounts of the effective propagation wavelength $\lambda G$ and the effective propagation wavelength $\lambda L$ to be sufficiently small, and two single mode waveguides are coupled via the leaky wave propagation region.

The present invention is to provide a method for realizing a quite effective and simple construction under a condition where the wave per se bend propagating direction in discontinuity of two single mode waveguide, center axes extended in the longitudinal direction are intersect.

A basic principle is based on quite simple principle for enabling couple of energy of the wave (coupling) between two single mode waveguides via the leaky wave or the like.

Namely, the idea is that since radiation of energy should be caused in the waveguide discontinuity to be loss in any event, and thus 100% radiation is positively caused to collect 100%.

Hereinafter, concerning construction or the like for realizing the principle, more detailed discussion will be given with explanation of physical phenomenon caused around a mirror (reflection mirror) important for understanding of the invention.

A passage "ideal function can be obtained only when a mirror greater than wavelength" suggests quite important and interesting phenomenon occurring around the reflection mirror. It is the fact "the condition is established around the reflection mirror at a certain condition where the wave subjecting scattering of the reflection mirror appears to be propagated with aggregated as if it is aggregated into a single beam even in a space having completely not enclosed in the lateral direction, such as a free space."

The phenomenon "appearing to be propagated with aggregated as if it is aggregated into a single beam even in a space having completely not enclosed in the lateral direction, such as a free space" suggest possibility of presence of more effective means utilizing a nature of the wave other the method forcedly enclosing the wave using the single mode waveguide. An existing concept "electromagnetic wave is radiated when i enclosed structure is lost" generally infiltrated to waveguide engineers as common sense has now been reversed.

If a structure which can reproduce the foregoing physical phenomenon occurring around the reflection mirror, can be truly reproduced on the waveguide integrated circuit, the light beam can be bent to an arbitrary angle as if the reflection mirror is present.

For understanding of such phenomenon, it may be easier to understand action of the reflection mirror according to a principle of Huygens-Fresnel once returning to principle of wave analysis away from concept of waveguide mode. By this, when a beam form wave incides to the reflection mirror having a certain size of opening, it can be understood that infinite number of elemental waves with taking the arbitrary point on the reflection mirror as a wave source, is generated.

Real mode of the beam shaped reflected wave observed in macro, is a main lobe obtained by combining complex amplitude of all of elemental wave and can appear as a sharp beam shape having quite narrow solid angle of the main lobe and restricted the side lobe only when the opening of the reflection mirror is sufficiently large in comparison with the wave length. The propagating direction of the wave surface of the reflected wave (equiphase surface) is varied the orientation for a certain angle with respect to the wave surface of the incident wave. A relationship of the angle has been widely known as a law of incident angle and discharge angle.

In the process where the wave varies own propagation path by presence of the reflection mirror, it is nothing more than that an interference effect of the wave in the multi-mode space is interposed for bending the wave surface (using the multi-mode space). In this case, naturally, the wave may not change the propagation path unless the wave surface is deflected. Namely, the corner reflector as typical waveguide bending element may not cause mutual action efficiently with the multi-mode space as long as it is mounted on the single mode waveguide. As a result, the function as the pure reflection mirror cannot be achieved efficiently.

In the foregoing explanation, it can be expected that the multi-mode space corresponding to a free space around the reflection mirror and a radiation structure for efficiently cause mutual action (coupling) between the multi-mode space and the single mode waveguide upon bending the light at arbitrary angle.

Then, discussion will be given for a structure to provide the single mode waveguide for efficiently exchanging energy of wave between the multi-mode space (radiation and reception).

As can be clear from reciprocal theorem, a transmitting antenna and a receiving antenna are equivalent except that a time development of mutually acting electromagnetic wave is opposite. This means that the wave radiated from the antenna can be completely received by employing a certain structure in a relationship of the transmission antenna and the mirror image with respect to the equiphase surface (wave surface) of this wave.

By this principle, as shown in FIG. 2, two antennas 8 and 9 having 45° of radiation directionality, for example, and the equiphase surface (wave surface) of the radiated wave become planar, are arranged to be mutually orthogonal. Then, complete couple of energy between these two antennas 8 and 9 should be possible.

Namely, by a combination of a pair of symmetric antennas, bending of 90° can be equivalently realized. The present invention can provide means for realizing a waveguide discontinuity of large bending angle on the basis of principle of coupling between the waveguide utilizing the leaky wave.

As a structure having properties of both of antenna and the single mode waveguide, the leaky wave waveguide (called as leaky wave antenna in viewpoint of antenna researcher) has been known. The leaky wave is a phenomenon causing a given rate of radiation to a certain particular direction in a slow-wave region (region propagating through the waveguide with respect to a effective refractive index greater than the effective refractive index of the single mode waveguide) in the vicinity of certain waveguide.

This can be considered as extreme making an adjacent distance infinitely smaller between respective antenna elements of the antenna group (phased array antenna arranged in an array fashion). Namely, upon incident to the reflection mirror wave, an equivalent condition as a condition where infinite number of elemental waves are generated on the surface.

On the other hand, the leaky wave propagation region also serves as the multi-mode space necessary for avoiding mutual interference of the elemental waves generated around the reflection mirror. Furthermore, the equiphase surface of the radiated wave is planar and, as a result, is relatively sharp in the radiation directionality.

Particularly, since the equiphase surfaces of the waves are planar, by preparing a structure reflected with taking the equiphase surface as a plane of symnmetry, ideal coupling of energy between two symmetrical leaky structure can be established. Thus, it is expected that in the waveguide discontinuity where the straight waveguide is bent or intersected, the energy of the wave launched from the incident end of one wave guide can be efficiently taken out from the output end of the other waveguide. The leaky wave waveguide is ideal structure in realization of acute waveguide discontinuity.

On the other hand, between the effective propagation wavelength $\lambda G$ (effective refractive index $nG$) of two single mode waveguides, the narrower intersection angle $\theta$ ($0<\theta \leq 90°$) at the intersecting point of the center axes extending in the longitudinal direction, and the effective propagation wavelength $\lambda L$ of the leaky wave propagation region, the following relationship is established:

$$\cos(\theta/2) = \lambda L/\lambda G$$

$$= (\lambda O/nL)/(\lambda O/nG)$$

$$= nG/nL$$

This expression is just Snell's Law describing diffraction of the wave in a boundary surface where two regions respectively having effective refractive index of $nG$ and $nL$ being in contact. On the other hand, the structure taking the wave surface of the leaky wave as an axis of symmetry can be easily realized with the structure shown in FIG. 2.

The waveguide discontinuity in the two-dimensional planer waveguide integrated circuit is considered as most effective application of the present invention. For realizing this, it becomes necessary to appropriately design the refractive index of the material and dimensions of the structure so that optimal effective refractive index can be obtained in respective of the single mode waveguide or the leaky wave propagation region.

For necessity of selection of large effective refractive index, the material having large refractive index having the leaky wave propagation region has to be selected inherently. Therefore, possibility of causing multi-mode in the layer thickness direction of the substrate is concerned. It is desired to make the number of waves in the layer thickness direction of the leaky wave propagation region into the single mode and to make it consistent in the layer thickness direction of the single mode waveguide, as long as possible.

It should be noted that a realizing method of acute waveguide discontinuity using the leaky wave coupling discussed herein is not limited to the waveguide structure of the electromagnetic wave, such as extremely high frequency wave, light or the like. It is applicable for the waveguide discontinuity for guiding the electron, carrier injection from the carrier layer to the well layer in a lower order quantum well structure of a compound semiconductor and so forth, which are inherent upon fabrication of a quantum effect device utilizing electron required to be handled as de Broglie wave, for example.

Furthermore, analyzing the coupling between the waveguide using the leaky wave in another viewpoint, the coupling phenomenon of the leaky wave can be obtained by quite simple combination of vectors which can be expressed by:

$$\kappa L = \kappa 1 + \kappa 2$$

assuming the wave number vector of the incident side single mode waveguide is $\kappa 1$ and the wave number vector of the leaky wave propagation region is KL and the wave number vector of the output side single mode waveguide is $\kappa 2$.

As a result of this, as the leaky wave propagation region generating the wave number vector $\kappa L$, possibility of use of a method other than the method to increase the effective refractive index, namely possibility of replacing with the period structure of the diffraction grating or the like providing the wave number vector equal to $\kappa L$.

In general, forming the regions having significantly differentiated the effective refractive indexes on the same substrate, cannot be said to be easily achieved in view of problem in complexity of the fabrication process or difficulty in establishing alignment between the waveguide materials. When application of the optical waveguide integrated circuit is concerned, the later finding that the period structure can be effective.

BRIEF DESCRIPTION OF THE DRAWINGS

The present invention will be understood more fully from the detailed description given herebelow and from the accompanying drawings of the preferred embodiment of the present invention, which, however, should not be taken to limit the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, wellknown structures are not shown in detail in order to avoid unnecessarily obscure the present invention.

Figure 1:
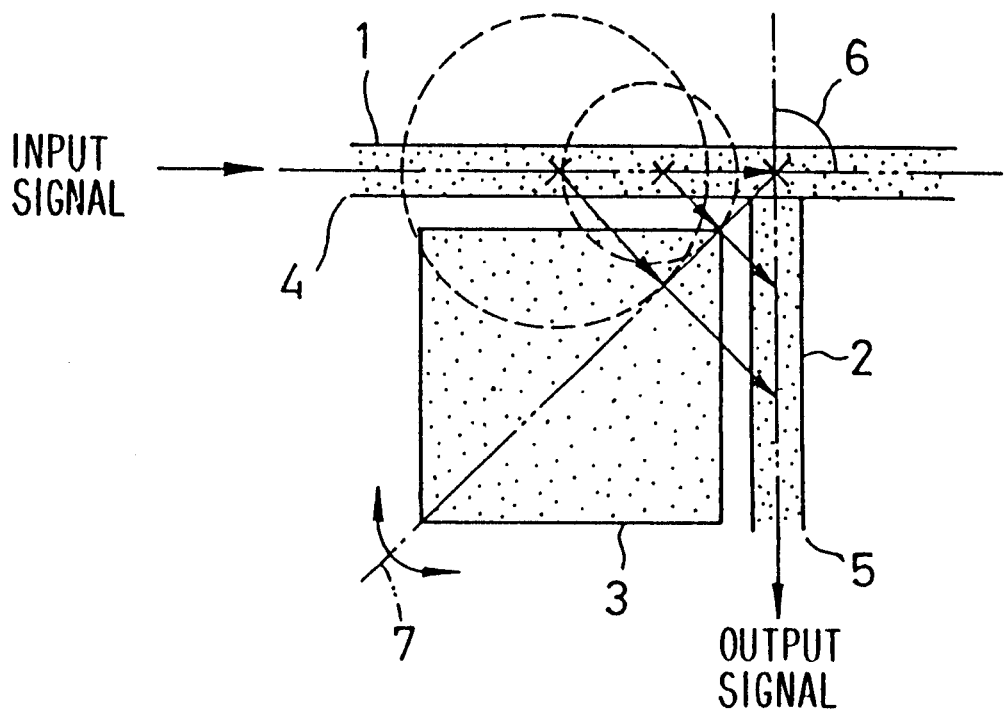
FIG. 1 is an illusttion showing an operation of the first embodiment of a waveguide element according to the present invention.
Figure 2:
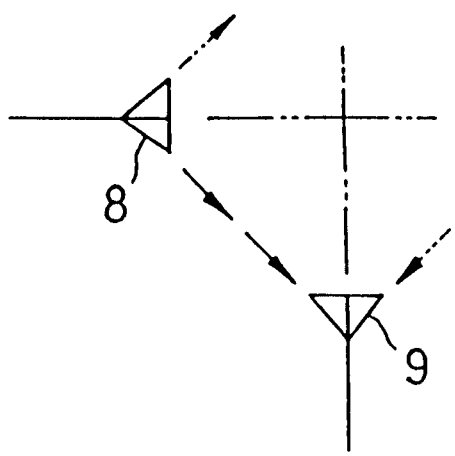
FIG. 2 is an illustration showing that the operation of the first embodiment of the waveguide element of the present invention is equivalent to transmission and reception of energy between two antennas.

Referring now to the drawings, FIG. 1 is an illustration showing an operation of the first embodiment of a waveguide element according to the present invention, and FIG. 2 is an illustration showing that the operation of the first embodiment of the waveguide element of the present invention is equivalent to transmission and reception of energy between two antennas.

In FIG. 2, two antennas 8 and 9 have radiation directionality of 45°, for example. The antennas 8 and 9 are arranged mutually perpendicular to each other so that equiphase surfaces of radiated waves becomes a plane. By this, complete coupling of energy between two antennas 8 and 9 becomes possible. Namely, by a combination of a pair of symmetric antennas 8 and 9, bending of 90° can be equivalently realized.

The first embodiment of the waveguide element according to the present invention realizes a waveguide discontinuity of large bending angle on the basis of a principle of a waveguide coupling utilizing a leaky wave. As a structure having both of a nature of the foregoing antenna, and a nature of a single mode waveguide, a leaky waveguide has been known.

The leaky wave is a phenomenon of a radiation in a given rate in a certain particular direction in a slow-wave region while propagating through waveguides 1 and 2, with respect to the slow-wave region in the vicinity of the certain waveguides 1 and 2. This can be considered as extreme where a distance between each of adjacent antenna elements of an antenna group arranged in an array fashion. Namely, when a reflection mirror wave is incided on a plane, a condition equivalent to a condition where infinite number of elemental waves are generated on the plane, can be established.

On the other hand, a leaky wave propagating region 3 serves as a multi-mode space necessary for causing mutual interference between elemental waves generated around the reflection mirror. Furthermore, equiphase surface of the radiated wave (wave surface) features in planar shape and in relatively sharp radiation directionality.

Since the equiphase surface (wave surface) of the wave is planar, an ideal energy couple between two symmetric leaky structure becomes possible when a structure reflected with taking the equiphase surface as a surface of symmetry, namely a structure reflected about an axis of symmetry, is prepared (see FIG. 1).

Accordingly, in the structure of the waveguide discontinuity, where the straight waveguides 1 and 2 are connected in angled fashion or intersected, it is expected that the energy of the wave launched from an incident end 4 of the straight waveguide 1 can be taken out from a output end 5 of the straight waveguide 2. The leaky waveguide indeed has an ideal structure for realizing acute waveguide discontinuity. Here, the reference numeral 6 denotes an intersection angle θ (0<θ≦90°). The intersection angle θ represents a narrower angle at an intersection of center axes of the straight waveguides 1 and 2 in the longitudinal directions.

Figure 3:
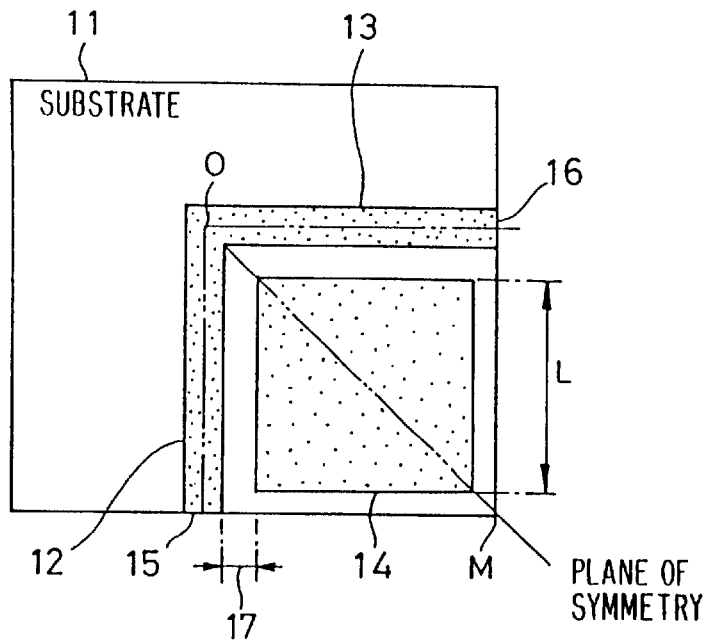
FIG. 3 is an illustration for explaining a construction of the fist embodiment of the waveguide element according to the present invention.
Figure 4:
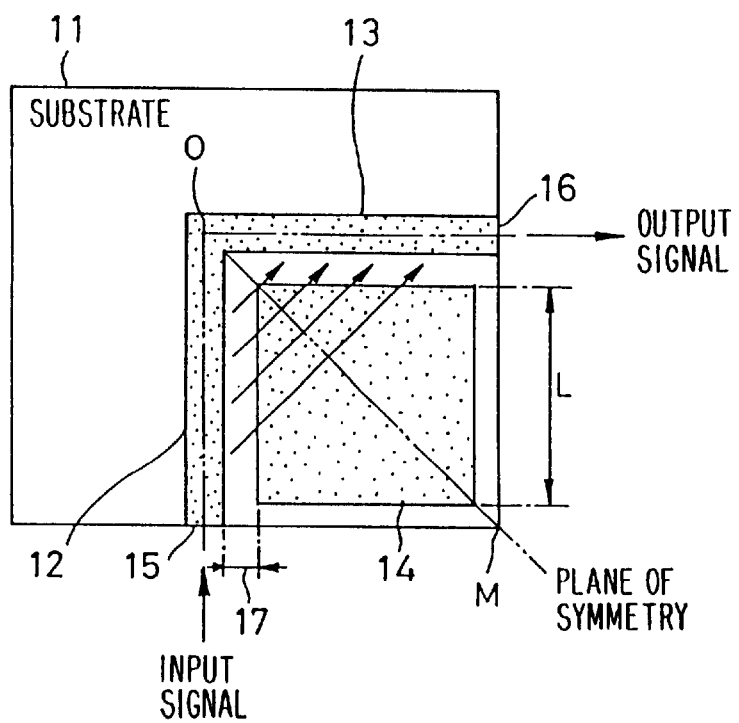
FIG. 4 is an illustration for explaining a condition of a wave propagated in the waveguide element of FIG. 3.

FIG. 3 is an illustration for explaining a construction of the first embodiment of the waveguide element according to the present invention, and FIG. 4 is an illustration for explaining a condition of a wave propagated in the waveguide element of FIG. 3. Discussion will be given hereinafter with respect to the first embodiment of the waveguide element according to the present invention with reference to FIGS. 3 and 4.

FIG. 3 shows a structure for realizing the ideal transmission characteristics utilizing the leaky wave in the waveguide discontinuity where the two single mode waveguides 12 and 13 having the same cross-sectional structures are arranged for intersecting the center axes extended in the longitudinal directions at an angle θ (0<θ≦90°).

A substrate Iro respectively provides the single mode waveguide 12, in which the base mode of the propagation wavelength is λG with respect to a wave having a certain oscillation sequency a t the incident side, and the single mode waveguide 13 at the output side having the same cross-sectional shape and propagation characteristics, while the center axes of the single mode waveguides 12 and 13 are intersected at the angle θ (0<θ≦90°), and a propagation wave of a dominant mode.

On the other hand, in the vicinity of an intersecting point O where the center axes of the incident side single mode waveguide 12 and the output side single mode waveguide 13 extended in the longitudinal directions, respectively, a leaky wave propagation region 14, in which an effective propagation wavelength of the base mode is cos(θ/2) times the effective propagation wavelength λG [or substantially 1/cos (θ/2) times an effective refractive index nG] of the single mode waveguides 12 and 13, and is in a quadrilateral configuration having each edge in a length of about L.

These single mode waveguides 12 and 13 and the leaky wave propagation region 14 are set so that higher order modes will not be generated with respect to the substrate in the perpendicular direction, and the number of waves in the thickness direction, respective, is consistent with each other.

It should be noted that these incident side single mode waveguide 12 and the output side single mode waveguide 13 may intersect with each other, connected at one point or not intersect. However, it is essential that it is symmetric relative to a straight line OM extending through the point O and equally dividing a supplementary angle (π−θ) of the angle θ. On the other hand, the length contributing for coupling is L.

Also, a distance 17 (=D) between the single mode waveguides 12 and 13 and leaky wave propagation region 14 is adjusted so as to couple wave energy between the leaky wave propagation region 14 and the single mode waveguides 12 and 13, to obtain a coupling coefficient of amplitude of about κ per unit length, can be obtained.

If it is desired to make the coupling coefficient K greater, occurrence of reflection at a moment where the wave reaches the position where coupling between the single mode waveguides 12 and 13 and the leaky wave propagation region 14 is initiated, is concerned. However, it is possible to avoid the occurrence of reflection by specially controlling radiation amount and radiation pattern of the wave to the leaky wave propagation region 14 by continuously varying the distance 17 along the respective single mode waveguides 12 and 13 or other way. In this case, the shape of the leaky wave propagation region 14 is not completely rectangular-shaped but is slightly distorted.

The first embodiment of the waveguide according to the present invention is excited by a signaling light launched to the incident end 15 of the incident side single mode waveguide 12 and the energy is gradually radiated to the leaky wave propagation region 14 with propagation. The radiation angle as measured from propagating direction of the wave is given from Snell's law of reflection. In this case, from a ratio of effective propagation wavelength (effective refraction index), the dominant mode of the effective propagation wavelength cos(θ/2) is expressed by:

$$\cos(\theta/2) = \lambda L / \lambda G$$

$$= (\lambda 0/nL)/(\lambda 0/nG)$$

$$= nG/nL$$

As a result of mutual interference of radiated waves, a trace of the wave propagated in the leaky wave propagation region 14 becomes substantially beam-shaped configuration. It should be noted that a total amount of energy radiated from the launched side single mode waveguide 12 to the leaky wave propagation region 14 becomes proportional to that expressed by:

$$(1-\exp(-2\kappa L))/2\kappa$$

By adjusting a product κL of the coupling coefficient κ of the amplitude and the length L, the output amount of the energy can be controlled. It should be noted that when the distance to mutually couple the leaky wave propagation region 14 and the single mode waveguides 12 and 13 is in a length L, the length of the portion effectively contributing for radiation of the energy of the wave, actually, is about (1/κ), as analogized from opening of the leaky wave antenna.

On the other hand, a common law generally applicable for overall antenna, greater opening of the antenna per se in comparison with the wavelength of the wave, higher radiation directionality of the antenna can be obtained. Namely, upon attempting for radiating substantially 100% of energy of the wave in ideal beam-shaped fashion, the coupling coefficient κ is lowered to be sufficiently lower that (1/λG), and in conjunction therewith, the length L is made greater so that the total amount of the radiated energy becomes not so small so as not to make the product κL too small Accordingly, in the waveguide discontinuity where the single mode waveguides 12 and 13 are angled or intersected, the energy of the wave launched from the incident end 15 of the incident side single mode waveguide 12 can be efficiently taken out from the output end 16 of the output side single mode waveguide 13.

Figure 5:
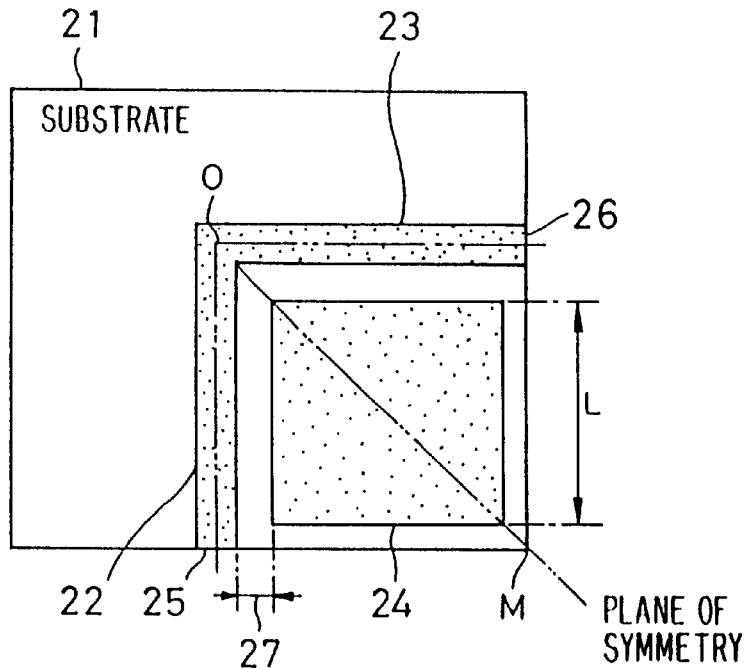
FIG. 5 is an illustration for explaining a construction of the first embodiment of an L-shaped optical waveguide bending of the present invention.
Figure 6:
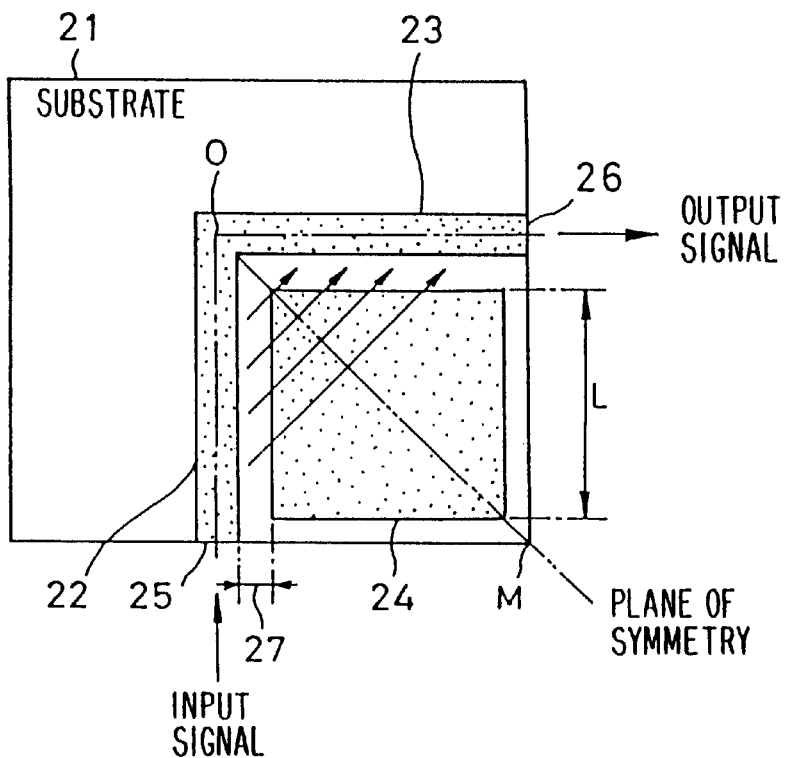
FIG. 6 is an illustration for explaining a condition of a wave propagating in the L-shaped waveguide bending of FIG. 5.

FIG. 5 is an illustration for explaining a construction of the first embodiment of an L-shaped optical waveguide bending of the present invention, and FIG. 6 is an illustration for explaining a condition of a wave propagating in the L-shaped waveguide bending of FIG. 5. An L-shaped optical waveguide bending where the quartz type single mode optical waveguides are angled in L-shaped configuration, will be discussed hereinafter with reference to FIGS. 5 and 6.

A substrate 21, in which the center axes of an incident side single mode waveguide 22 and an output side single mode waveguide 23 respectively extending in the longitudinal direction intersect at a right angle (90°), the incident side single mode waveguide having a propagation wavelength of a dominant mode of 1096 nm (effective refractive index is 1.414) and an output side single mode waveguide having the same cross-sectional shape and propagation characteristics as the incident side single mode waveguide are provided respectively, is prepared. Here, the center axes of the incident side single mode waveguide 22 and the output side single mode waveguide 23 extended in the longitudinal directions are intersected at the point O.

In the vicinity of the point O, a leaky wave propagation region 24 having the propagation wavelength of the dominant ode of 775 nm corresponding to $1/(2)^{1/2}$ of the single mode waveguides 22 and 23 (effective refractive index is 2.000 corresponding to $(2)^{1/2}$ times), and of substantially square-shape having length of one edge of 50 μm, is provided.

On the other hand, the leaky wave propagation region 24 is formed by using a spattered region of $Ta_2O_3$. These single mode waveguides 22 and 23 and the leaky wave propagation region 24 are set at a layer thickness of 2 μm so that the higher order mode is not generated with respect to the perpendicular direction to the substrate 21 and the number of waves on the thickness direction is mutually consistent with each other.

Furthermore, so as to cause coupling of propagating wave y in the extent of κL=2.0 (or 2κL=4.0) between the leaky wave propagation region 24 and respective of the single mode waveguides 22 and 23, the distance 27 between the single mode waveguides 22 and 23 and the leaky wave propagation region 24 is set.

When a signal light of wavelength 1550 nm is launched to the incident end 25 of the incident side single mode waveguide 22, two single mode waveguides 22 and 23 are coupled via the leaky wave to obtain ideal transmission characteristics without causing excessive loss even in the acute L-shaped waveguide bending.

Accordingly, in the waveguide discontinuity where the single mode waveguides 22 and 23 are angled or intersected, the energy of the wave launched from the incident end 25 of the incident side single mode waveguide 22 can be efficiently taken out from the output end 26 of the output side single mode waveguide 23.

Figure 7:
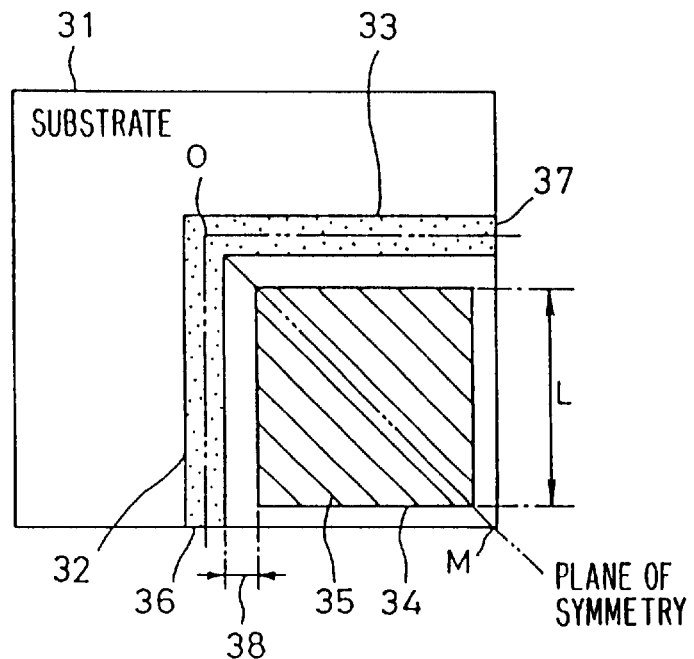
FIG. 7 is an illustration for explaining a construction of the second embodiment of a waveguide element according to the present invention.
Figure 8:
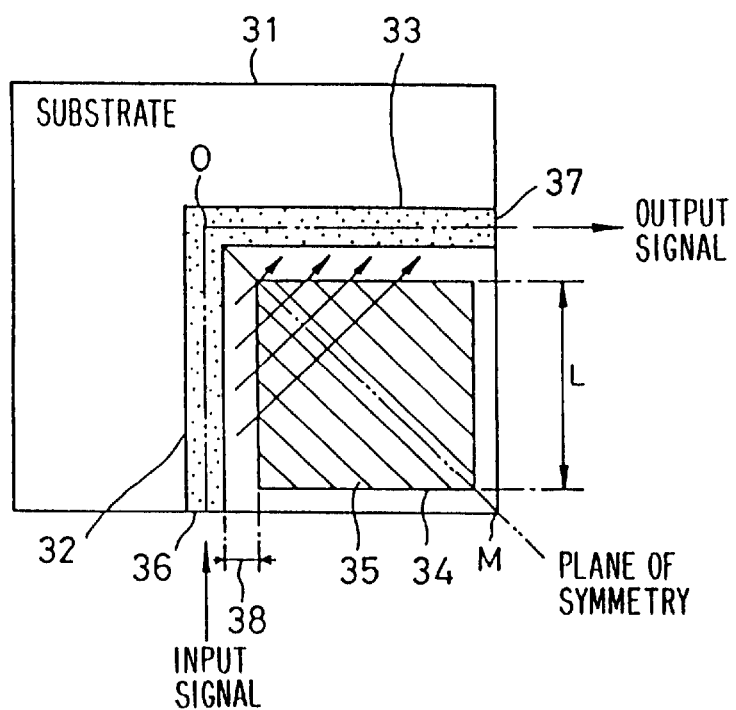
FIG. 8 is an illustration for explaining a construction of the second embodiment of the waveguide element of FIG. 7.

FIG. 7 is an illustration for explaining a construction of the second embodiment of a waveguide element according to the present invention, and FIG. 8 is an illustration for explaining a construction of the second embodiment of the waveguide element of FIG. 7. The second embodiment of the waveguide element according to the present invention will be discussed hereinafter with reference to FIGS. 7 and 8.

FIG. 7 shows a construction for realizing ideal transmission characteristics using the leaky wave in the waveguide discontinuity, in which two single mode waveguides 32 and 33 having identical cross-sectional structure are arranged to intersect so that the center axes of the two single mode waveguides 32 and 33 extended in the longitudinal directions intersect at an angle θ (0<θ≦90°).

A substrate 31 is prepared with two single mode waveguides 32 and 33 intersecting the center axes thereof extending in the longitudinal direction at the angle θ (0<θ≦90°), the incident side single mode waveguide 32 having the propagation wavelength of the dominant mode relative to the number of oscillation of the wave is λG, and the output side single mode waveguide 33 having the same cross-sectional shape and the propagation characteristics.

On the other hand, in the vicinity of the point O where the center axes of two single mode waveguides 32 and 33 extended in the longitudinal directions, a diffraction grating 35 having a period of cos(θ/2) of the effective propagation wavelength λG of the single mode waveguides 32 and 33 and a grating vector inclined toward the single mode waveguide 33 for an angle of θ/2 with respect to propagating direction of the wave propagating in the single mode waveguide 32, is formed and the leaky wave propagating region 34 of substantially lozenge shape having one edge length of L.

These single mode waveguides 32 and 33 and the leaky wave propagating region 34 are set the layer thickness, in which higher order mode is not generated in the substrate 31 in the vertical direction and number of wave of the layer thickness direction is consistent. It should be appreciated that these incident side single mode waveguide 32 and the output side single mode waveguide 33 may be intersected with each other, connected at one point or not intersect. However, it is essential that it is symmetric relative to a straight line OM extending through the point O and equally dividing a supplementary angle (π−θ) of the angle θ. On the other hand, the length contributing for coupling is L.

Also, so that coupling of the wave may be caused between the leaky wave propagating region 34 and respective of the single mode waveguides 32 and 33, the single mode waveguides 32 and 33 and the leaky wave propagation region 34 are set so that a coupling coefficient of amplitude about κ per unit length thereof can be obtained.

The foregoing waveguide elements are excited by the signal line launched to the incident end 36 of the incident side single mode waveguide 32 to gradually radiate the energy to the leaky wave propagation region 34 with propagation. The radiation angle as measured from propagation of the wave is parallel to the grating vector κG of the diffraction grating 35. Assuming that the wave number vector of the incident wave and the output wave propagated through the single mode waveguides 32 and 33 are respectively k1 and k2, the following relationship is established between three vectors:

$$\kappa G = \kappa 1 + k2$$

As a result of mutual interference of the radiated wave, a trace of the wave propagated in the leaky wave propagation region 34 becomes substantially beam shaped. Here, the total amount of the energy radiated from the incident side single mode waveguide 32 to the leaky wave propagation region 34 is proportional to the following expression with taking the coupling coefficient of the amplitude per unit length being κ:

$$(1-\exp(-2\kappa L))/2\kappa$$

By adjusting the product κL of the coupling coefficient κ of the amplitude and the length L, the output amount of the energy can be controlled.

On the other hand, even when the distance of mutual coupling between the leaky wave propagation region 34 and the single mode waveguides 32 and 33 per s is only L, the length of the portion effectively contributing for radiation of energy of the wave in practice is substantially (1/κ) from analogizing of the opening of the leaky wave antenna. In this case, as a law generally applicable for overall antennas, the opening of the antenna per se becomes greater in comparison with the wavelength of the wave sufficiently, radiation directionality of the antenna becomes higher.

Namely, when substantially 100% of energy of the wave is to be radiated in ideal beam shape, the coupling coefficient κ is sufficiently lowered than (1/λG), the length L is set to be large so that the total amount of the radiated energy becomes ot too small so that the product κL should not be excessively small.

Accordingly, in the waveguide discontinuity where the single mode waveguides 32 and 33 are angled or intersected, the energy of the wave launched from the incident end 15 of the incident side single mode waveguide 32 can be efficiently taken out from the output end 16 of the output side single mode waveguide 33.

Figure 9:
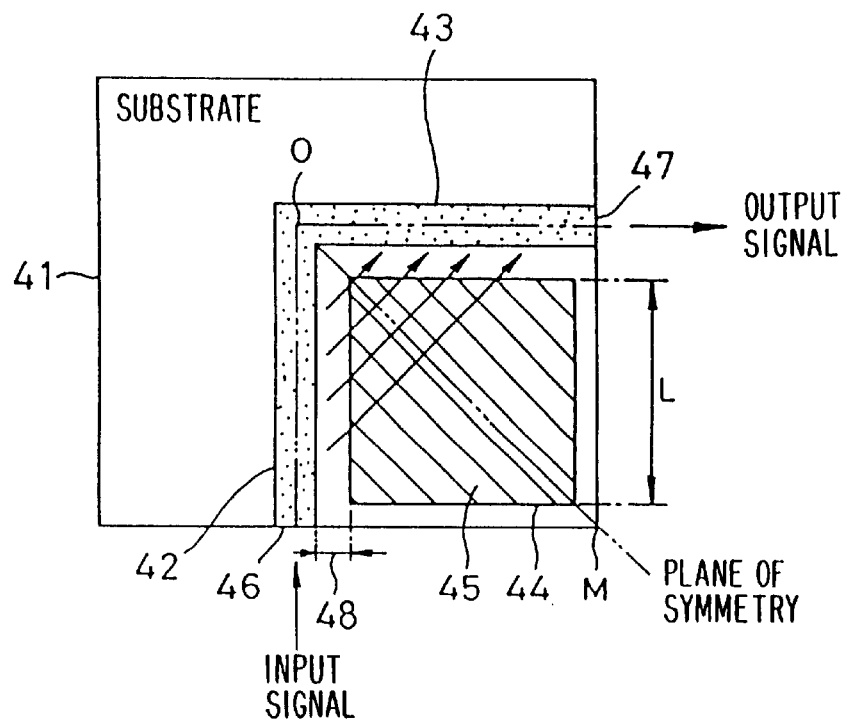
FIG. 9 is an illustration for explaining a construction of the second embodiment of an L-shaped extremely high frequency wave waveguide bending of the present invention.
Figure 10:
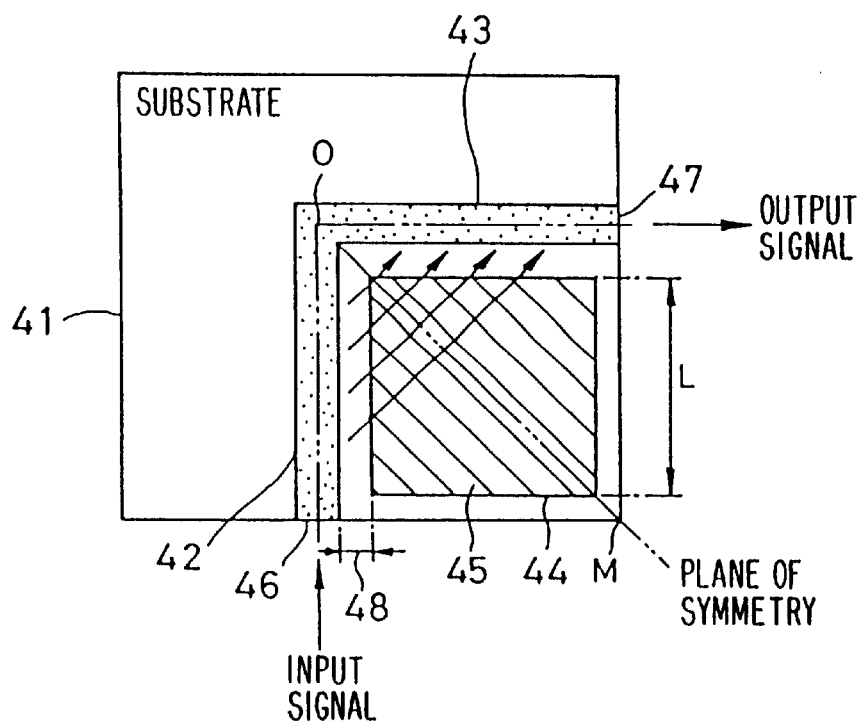
FIG. 10 is an illustration for explaining a condition of a wave propagated in the L-shaped extremely high frequency ave waveguide element of FIG. 9.

FIG. 9 is an illustration for explaining a structure of the second embodiment of an L-shaped extremely high frequency wave waveguide bending of the present invention, and FIG. 10 is an illustration for explaining a condition of a wave propagated in the L-shaped extremely high frequency wave waveguide element of FIG. 9.

FIG. 9 shows an example, in which the second embodiment of the waveguide element according to the present invention is employed in an L-shaped extremely high frequency wave waveguide bending in NRD (Non Radiative Dielectric) guide transmitting an extremely high frequency wave of 50 GHz band.

A substrate 41, in which the center axes of an incident side single mode waveguide 42 and a side single mode waveguide 43 respectively extending in the longitudinal direction intersect at a right angle (90°), the incident side single mode waveguide having a propagation wavelength of a dominant mode of 4.243 mm (effective refraction index is 1.414) and an output side single mode waveguide having the same cross-sectional shape and propagation characteristics as the incident side single mode waveguide are provided respectively, is prepared. Here, the center axes of the incident side single mode waveguide 42 and the output side single mode waveguide 403 extended in the longitudinal directions are intersected at the point O.

On the other hand, in the vicinity of an intersecting point O where the center axes of the incident side single mode waveguide 42 and the output side single mode waveguide 43 extended in the longitudinal directions, respectively, a leaky wave propagation region 44, in which a diffraction grating 45 having a period of 3 mm corresponding to cos(θ/2) of the effective propagation wavelength λG of the single mode waveguides 42 and 43 and a grating vector inclined toward the single mode waveguide 43 for an angle of θ/2 with respect to propagating direction of the wave propagating in the single mode waveguide 42, is formed and the leaky wave propagating region 44 of substantially rectangular shape having one edge length of L.

The layer thickness of single mode waveguides 42 and 43 and the leaky wave propagation region 44 are set to be 2 μm so that higher order modes will not be generated in respective of substrate in the perpendicular direction to the substrate 41, and the number of wave in the thickness direction, respectively, is consistent with each other.

On the other hand, so as to cause coupling of wave in the extent of κL=2.0 (or 2κL=4.0) between the leaky wave propagation region 44 and respective of the single mode waveguides 42 and 43, the distance 48 between the single mode waveguides 42 and 43 and the leaky wave propagation region 44 is set to be 1 mm.

When the extremely high frequency signal having a frequency of 50 GHz is launched to the incident end 46 of the incident side single mode waveguide 42, two single mode waveguides 42 and 43 are mutually coupled via the leaky wave to obtain ideal propagation characteristics without excessive loss even at the acute L-shaped waveguide bending, as shown in FIG. 10.

Accordingly, in the waveguide discontinuity where the single mode waveguides 42 and 43 are angled or intersected, the energy of the wave launched from the incident end 46 of the incident side single mode waveguide 42 can be efficiently taken out from the output end 47 of the output side single mode waveguide 43.

Figure 11:
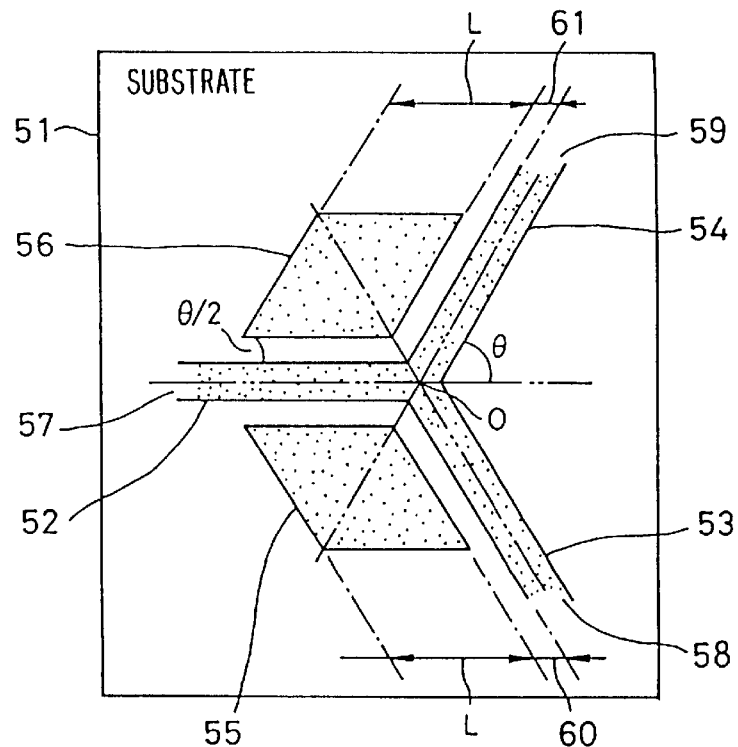
FIG. 11 is an illustration for explaining a construction of the third embodiment of a waveguide branch or coupler according to the present invention.
Figure 12:
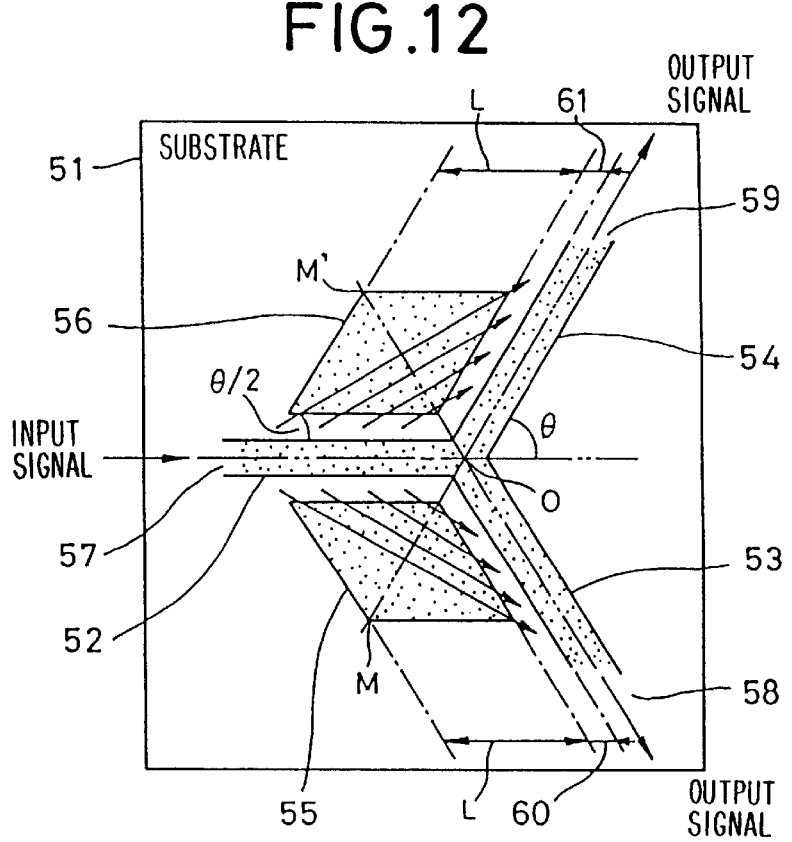
FIG. 12 is an illustration showing a condition of the wave propagating in the waveguide branch or coupler of FIG. 11 as derived arithmetically.

FIG. 11 is an illustration for explaining a construction of the third embodiment of a waveguide branch or coupler according to the present invention, and FIG. 12 is an illustration showing a condition of the wave propagating in the waveguide branch or coupler of FIG. 11 as derived derived arithmetically. The third embodiment of a waveguide branch or coupler according to the present invention will be discussed hereinafter with reference to FIGS. 11 and 12.

FIG. 11 shows a construction for realizing an ideal transmission characteristics utilizing the leaky wave in a symmetric Y-shaped waveguide branching structure, which includes three single mode waveguides 52, 53 and 54 of mutually identical cross-sectional construction, and, with respect to the center axis of the particular waveguide 52 extended in the longitudinal direction, the center axes of the remaining two waveguides 53 and 54 extended in the longitudinal directions are intersected at an angle θ (0<θ≦90°).

A substrate 51, having three single mode waveguides 52, 53 and 54, in which the propagation wavelength of the dominant mode with respect to the wave of a certain oscillation frequency is λG, the cross-sectional shapes and the propagation characteristics are mutually the same, and with respect to the center axis of the particular waveguide 52 extended in the longitudinal direction, the center axes of the remaining two waveguides 53 and 54 extended in the longitudinal directions are intersected at an angle θ (0<θ≦90°), is prepared.

On the other hand, in the vicinity of the point O where the center axes of the single mode waveguides 53 and 54 extending in the longitudinal directions are intersecting with each other, leaky wave propagation regions 55 and 56 of substantially lozenge shape having one edge length of substantially L with the effective propagation wavelength of the dominant mode being $\cos(\theta/2)$ times of the effective propagation wavelength λG of the single mode waveguides 52 and 53 [or $1/\cos(\theta/2)$ of the effective refractive index nG], are provided.

These single mode waveguides 52 and 53 and the leaky wave propagation regions 55 and 56 are set at layer thickness respectively so that higher order mode may not be generated with respect to the perpendicular direction of the substrate 51 and number of waves in the layer thickness direction are mutually consistent with each other.

It should be noted that three single mode waveguides 52, 53 and 54 may be intersect with each other, connected at one point or not intersect. However, it is essential that the single mode waveguides 52 and 53 and the single mode waveguides 52 and 54 respectively extend through the point O and have to be symmetric relative to a straight lines OM, OM' equally dividing a supplementary angle (π−θ) of the angle θ. On the other hand, the length contributing for coupling is L.

On the other hand, so as to cause coupling between the leaky wave propagation regions 55 and 56 and respective of the single mode waveguides 52, 53 and 54, the distances 60 and 61 between the single mode waveguides 52, 53 and 54 and the leaky wave propagation regions 55 and 56 are adjusted to obtain the coupling coefficient of the amplitude of about κ. For these, concerning the distances 60 and 61, control means similar to that explained in the first embodiment of the present invention, may be employed.

The Y-shaped waveguide branch or coupler shown in FIG. 11 is excited by the signal light launched to the incident end 57 of the single mode waveguide 52 with gradually radiating to the leaky wave propagation regions 55 and 56. Here, the principle of the coupling of the wave via the leaky wave is the same as that discussed in terms of the first embodiment, except for the region contributing varied from one into two.

On the other hand, it can realize Y-shaped branch even when the diffraction grating formed under the same design method as that of the design method discussed in terms of the second embodiment of the present invention in place of the regions having different refractive indexes as the leaky wave propagation regions 55 and 56.

Accordingly, in the waveguide discontinuity, in which the single mode waveguides 52, 53 and 54 are intersected, the energy of the wave launched from the incident end 57 of the incident side single mode waveguide 52 can be efficiently taken out from the output ends 58 and 59 of respective of the output side single mode waveguides 53 and 54.

Figure 13:
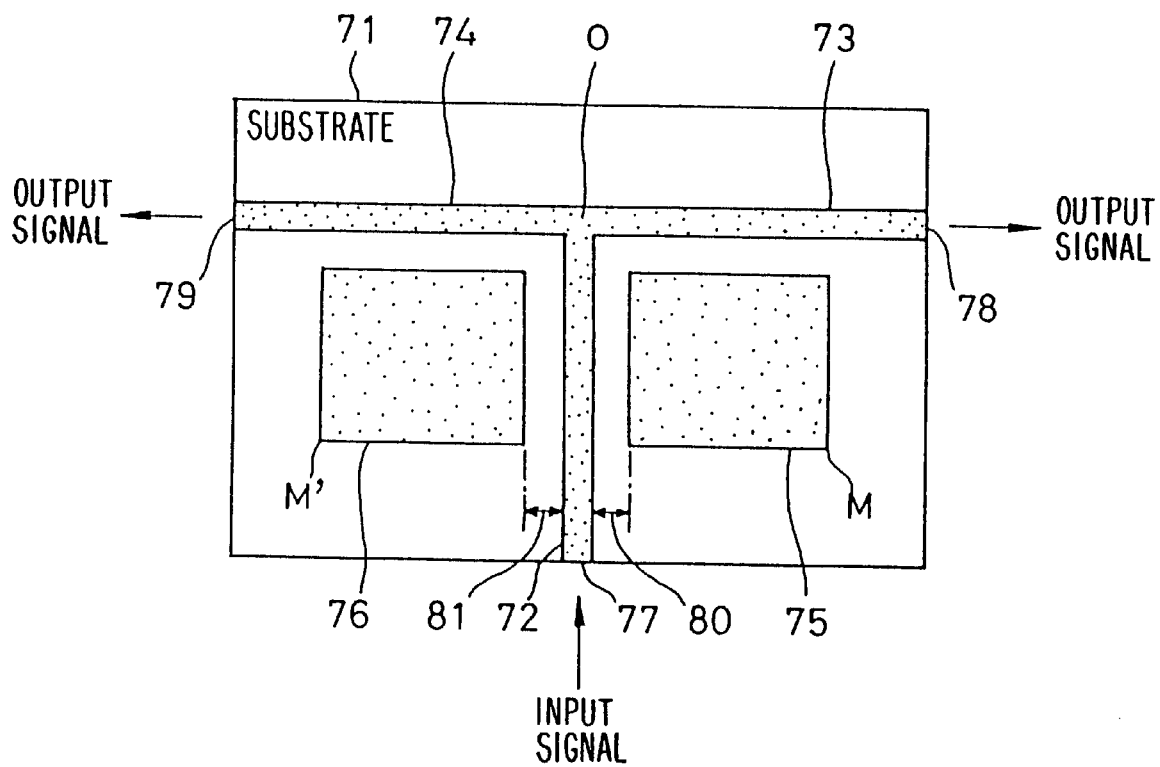
FIG. 13 is an illustration for explaining a construction of the third embodiment of a T-shaped waveguide branch or coupler according to the present invention.
Figure 14:
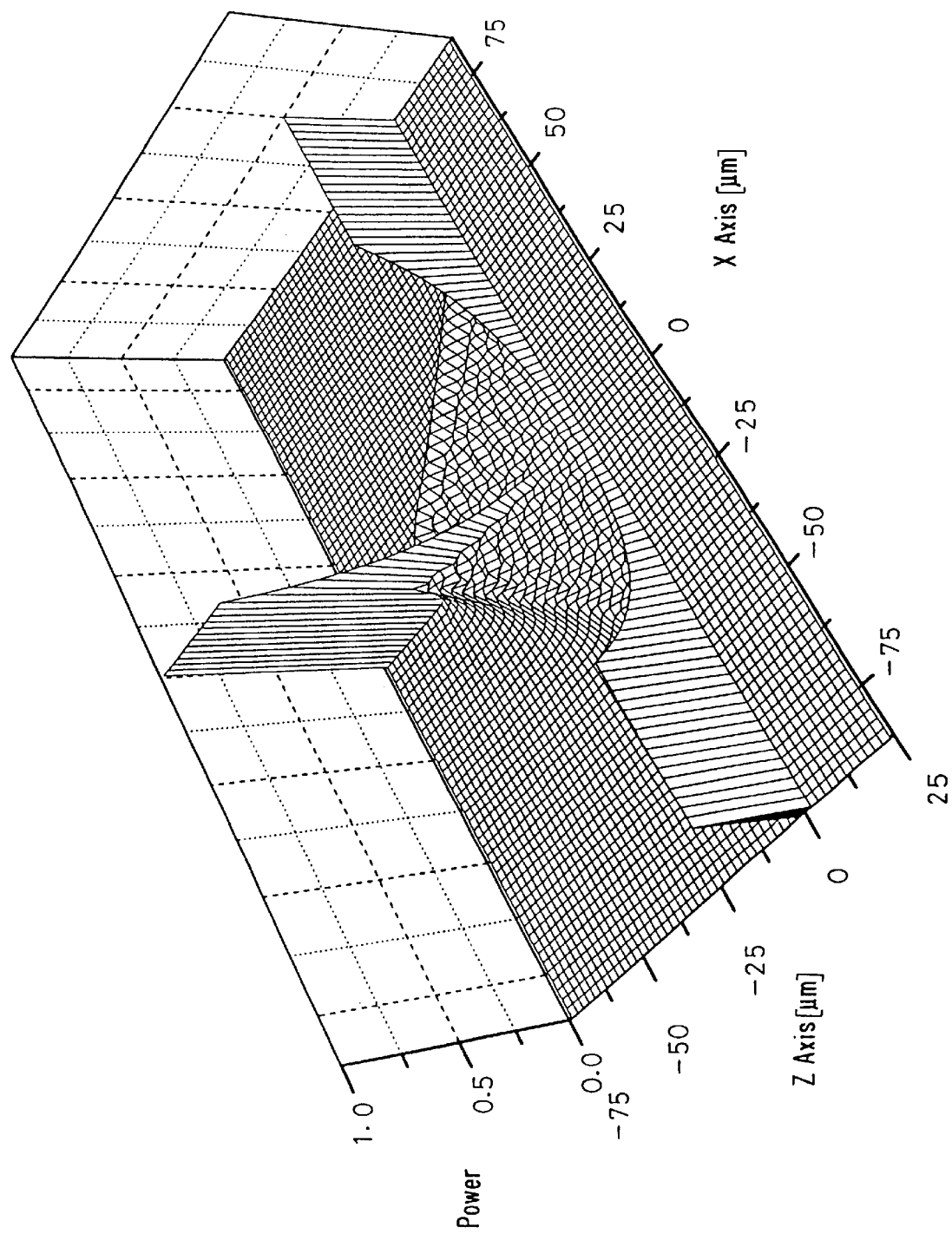
FIG. 14 is an illustration showing a condition of the wave propagating in the T-shaped waveguide branch or coupler of FIG. 13 as derived arithmetically.

FIG. 13 is an illustration for explaining a construction of the third embodiment of a T-shaped waveguide branch or coupler according to the present invention, and FIG. 14 is an illustration showing a condition of the wave propagating in the T-shaped waveguide branch or coupler of FIG. 13 as derived arithmetically. The third embodiment of the T-shaped waveguide branch or coupler according to the present invention will be discussed hereinafter with reference to FIGS. 13 and 14.

FIG. 13 shows an example employing the T-shaped waveguide type optical branch or coupler of the quartz type single mode optical waveguide of the shaft of the third embodiment of the present invention set forth above, and FIG. 14 shows a result of theoretical calculation of the amplitude of the wave to be propagated in the T-shaped waveguide type optical branch or coupler.

A substrate 71, in which the center axes of single mode waveguides 72, 73 and 74 extending in the longitudinal direction are intersected at a right angle (90°), the incident side single mode waveguide 72 having a propagation wavelength of a dominant mode of 1096 nm (effective refractive index is 1.414) and a output side single mode waveguides 73 and 74 having the same cross-sectional shape and propagation characteristics as the incident side single mode waveguide are provided respectively, is prepared.

Here, with respect to the center axis of the incident side single mode waveguide 72, the side single mode waveguides 73 and 74 extended in the longitudinal directions are symmetric relative to each other.

In the vicinity of the point O, at which the center axes of the single mode waveguides 72, 73 and 74 extended in the longitudinal direction intersect, a leaky wave propagation regions 75 and 76 having the propagation wavelength of the dominant mode of 775 nm corresponding to $1/(2)^{1/2}$ of respective effective propagation wavelength λG of the single mode waveguides 72, 73 and 74 (effective refraction index is 2.000 corresponding to $(2)^{1/2}$ times), and of substantially square-shape having length of one edge of 50 μm, are provided.

On the other hand, the leaky wave propagation regions 75 and 76 are formed by using a spattered region of $Ta_2O_3$. These single mode waveguides 72, 73 and 74 and the leaky wave propagation regions 75 and 76 are set such a layer thickness so that the higher order mode is not generated with respect to the perpendicular direction to the substrate 71 and the number of waves on the thickness direction is mutually consistent with each other.

It should be noted that three single mode waveguides 72, 73 and 74 may be intersect with each other, connected at one point or not intersect. However, it is essential that the single mode waveguides 72 and 73 and the single mode waveguides 72 and 74 respectively extend through the point O and have to be symmetric relative to a straight lines OM, OM' equally dividing a supplementary angle (π−θ) of the angle θ.

Furthermore, so as to cause coupling in the extent of κL=2.0 (or 2κL=4.0) between the leaky wave propagation regions 75 and 76 and respective of the single mode waveguides 72, 73 and 74, the distances 80 and 81 between the single mode waveguides 72, 73 and 74 and the leaky wave propagation regions 75 and 76 are set.

When a signal light of wavelength 1550 nm is launched to the incident end 77 of the incident side single mode waveguide 72, mutually intersecting ones among three single mode waveguides 72, 73 and 74 are coupled via the leaky wave to obtain ideal transmission characteristics without causing excessive loss even in the acute L-shaped waveguide bending, as shown in FIG. 14. The shown embodiment is expected to provide significant advantage in achieving higher package density of the optical integrated circuit.

Accordingly, in the waveguide discontinuity where the single mode waveguides 72, 73 and 74 are intersected, the energy of the wave launched from the incident end 77 of the incident side single mode waveguide 72 can be efficiently taken out from the output ends 78 and 79 of the output side single mode waveguides 73 and 74.

Figure 15:
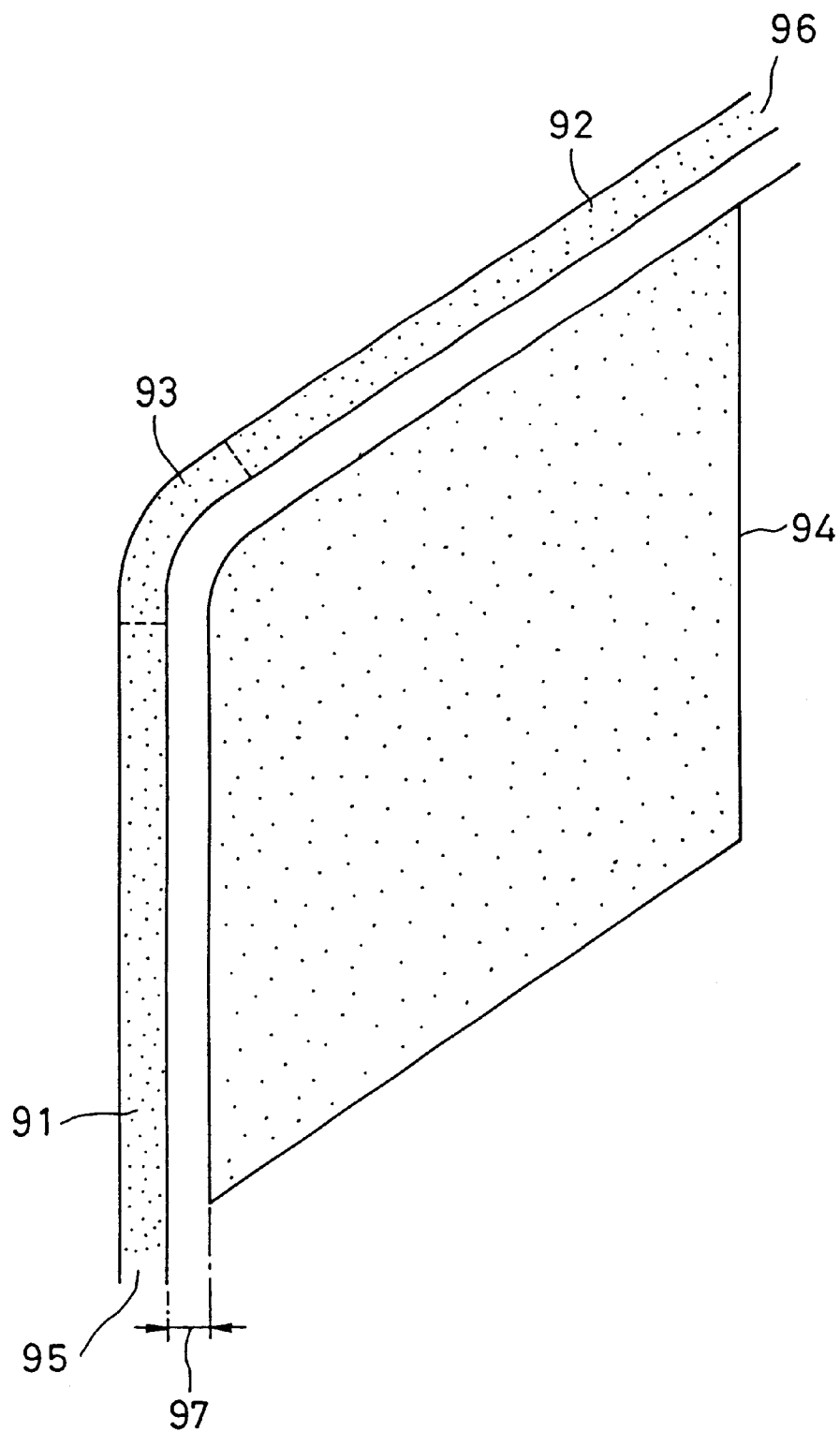
FIG. 15 is an illustration showing a construction of the fourth embodiment of a waveguide element according to the present invention.

FIG. 15 is an illustration showing a construction of the fourth embodiment of a waveguide element according to the present invention. In FIG. 15, the fourth embodiment of the waveguide element according to the present invention has the same construction as the waveguide element set forth above except that the single mode waveguides 91 and 92 are connected with each other by a bending waveguide 93 having a predetermined radius of curvature.

The curvature radius of the bending waveguide 93 is variable depending upon connecting condition. The shape of the leaky wave propagation region 94 is varied depending upon variation of the curvature radius of the bending waveguide 93.

In the waveguide element in the fourth embodiment of the present invention, like components to those of the waveguide element set forth above will be identified by like reference numerals and the detailed description thereof will be neglected for avoiding redundancy of disclosure and whereby to keep the disclosure simple enough to facilitate clear understanding of the present invention.

On the other hand, the reference numeral 95 denotes an incident end of the incident side single mode waveguide 91, 96 denotes an output end of the output side single mode waveguide 92, and the reference numeral 97 denotes the interval between the single mode waveguide 91, 92 and the leaky wave propagation region 94.

Also, the foregoing content will be applicable for the waveguide type branch or coupler.

Figure 16:
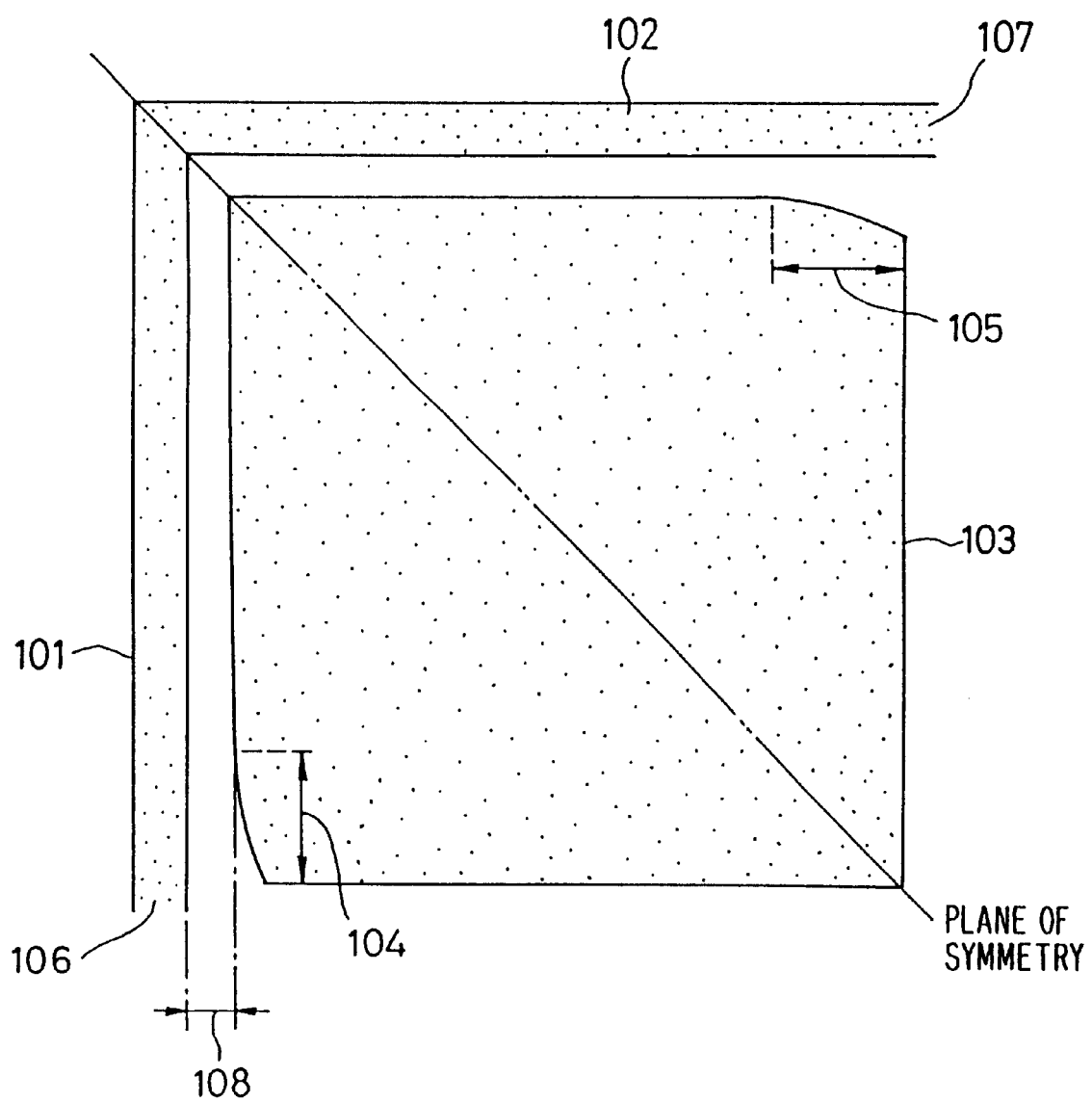
FIG. 16 is an illustration showing a construction of the fifth embodiment of a waveguide element according to the present invention.

FIG. 16 is an illustration showing a construction of the fifth embodiment of a waveguide element according to the present invention. In FIG. 16, the fifth embodiment of the waveguide element according to the present invention has the same construction as the waveguide element set forth above except that tapered portions 104 and 105 are provided.

The tapered portions 104 and 105 are designed for continuously varying a distance 108 along the longitudinal direction of the single mode waveguides 101 and 102 for spatially controlling a radiation amount and a radiation pattern of the wave to a leaky wave propagation region 103.

By this, in the case where the coupling coefficient κ is desired to be greater, it becomes possible to avoid a concern for reflection at a moment where the wave reaches the portion starting coupling of between the single mode waveguides 101 and 102 and the leaky wave propagation region 103. By providing K these tapered portions 104 and 105, the shape of the leaky wave propagation region 103 is not completely rectangular in shape but is slightly deformed.

In the fifth embodiment of the waveguide element according to the present invention, like components to those in the foregoing waveguide element will be neglected for avoiding redundancy of disclosure and whereby to keep the disclosure simple enough to facilitate clear understanding of the present invention. On the other hand, the reference numeral 106 denotes an incident end of the incident side single mode waveguide 101, 107 denotes an output end of the output side single move waveguide 102. Also, the foregoing content will be applicable for the waveguide type branch or coupler.

Figure 17:
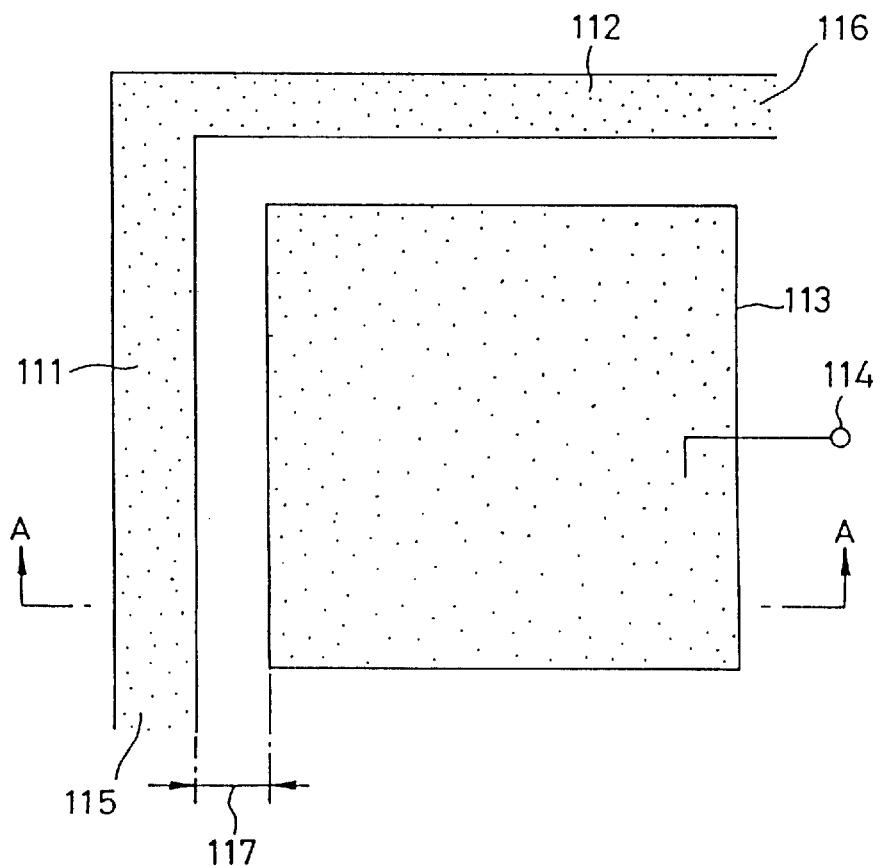
FIG. 17 is an illustration showing a construction of the sixth embodiment of a waveguide element according to the present invention.
Figure 18:
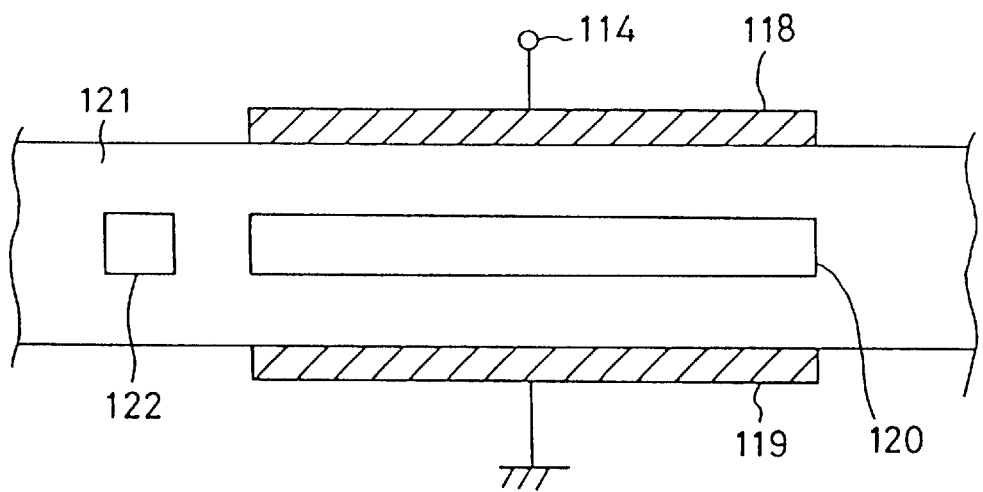
FIG. 18 is a section taken along line A—A of FIG. 17.

FIG. 17 is an illustration showing a construction of the sixth embodiment of a waveguide element according to the present invention, and FIG. 18 is a section taken along line A—A of FIG. 17. In FIGS. 17 and 18, the shown embodiment of the waveguide element according to the present invention has the same construction as the foregoing waveguide element except that a mechanism for controlling the leaky wave propagation region 113 is provided.

A mechanism for controlling the leaky wave propagation region 113 is constructed with a terminal 114, to which a voltage (electric field) as a control signal is applied, electrodes 118 and 119 and an electro-optic crystal 120. It should be noted that for the electro-optic crystal 120, a material (e.g. lithium niobate and the like) variable of absorption coefficient or refraction index depending upon the electric field, may be used.

Accordingly, by applying the voltage as the control signal to the terminal 114, the absorption coefficient and/or refraction index of the electro-optic crystal 120 are varied by the electrodes 118 and 119. Thus, one of the effective propagation wavelength and attenuation coefficient of wave to be propagated in the leaky wave propagation region 113 can be controlled.

Here, the reference numeral 115 denotes an incident end of the incident side single mode waveguide 111, and 116 denotes a output end of the output side single mode waveguide 112, and 117 denotes distance between the single mode waveguides 111 and 112 and the leaky wave propagation region 113. Also, the reference numeral 121 denotes a quartz forming respective of the single mode waveguides 111 and 112 and the leaky wave propagation region 113, and 112 denotes a core for forming the single mode waveguide 111.

It should be noted that, in the discussion for the sixth embodiment of the waveguide element according to the present invention, like components of the similar construction to those of the foregoing waveguide element will be identified by like reference numerals and detailed description thereof is neglected for keeping the disclosure simply enough for facilitating clear understanding of the invention. Also, while discussion has been given hereinabove concerning the case where the voltage (electric field) is applied as a signal for controlling one of the effective propagation wavelength and the attenuation coefficient of the wave propagating in the leaky wave propagation region 113, equivalent control may be performed by application an electric current, irradiation of a light beam, application of a magnetic field, heating, pressurizingandsoforth. Furthermore, the foregoing content is applicable for the waveguide type branch or coupler.

Thus, by effectively using a nature of the leaky wave antenna as means for coupling two waveguides having high symmetric property, means for acutely varying a wave propagating direction in a short distance.

On the other hand, from the foregoing effect, the length of the taper portion provided for the purpose of transition at upstream and downstream sides of the waveguide discontinuity can be eliminated, a propagation loss proportional to the length can be reduced. Also, since excessive loss due to radiation and/or reflection at the discontinuity portion may not be caused, loss of energy of the wave in the waveguide discontinuity can be reduced.

Furthermore, by the foregoing two effects, since the elongated waveguide tapered structure, freedom in layout of various waveguide functional elements can be improved. In conjunction therewith, the waveguide functional elements can be connected with quite low loss, package density of the waveguide integrated circuit can be improved.

As set forth above, the waveguide element, the waveguide branch or coupler element, the waveguide integrated circuit according to the present invention may provide means for acutely varying the wave propagation direction in short distance to realize improvement of freedom of layout of various waveguide functional elements, down-sizing, reduction of low, improvement of package density and so forth.

With the waveguide elements according to the present invention as set forth above, in the waveguide elements having at least one of bending and intersection of the straight waveguides for propagating the wave, acute waveguide discontinuity, such as a right angle bending (L-shaped bending) or branching (T-shaped branching) can be realized by leaky wave coupling of the wave propagating in the first and second straight waveguides forming at least one of bending and intersection substantially at the same rate, by means of leaky wave propagation region.

On the other hand, by the waveguide branch or coupler element according to the present invention constructed as set forth above, in the waveguide branch or coupler element having at least one of bending and intersection of the straight waveguides for propagating the wave, acute waveguide discontinuity, such as a right angle bending (L-shaped bending) or branching (T-shaped branching) can be realized by leaky wave coupling of the wave propagating in the first and second straight waveguides forming at least one of bending and intersection substantially at the same rate, by means of the first leaky wave propagation region, and by leaky wave coupling of the wave propagating in the first and third straight waveguides forming at least one of bending and intersection substantially at the same rate, by means of the second leaky wave propagation region.

Furthermore, by the waveguide integrated circuit according to the present invention constructed as set forth above, in the waveguide integrated circuit having at least one of bending and intersection of the straight waveguides for propagating the wave, acute waveguide discontinuity, such as a right angle bending (L-shaped bending) or branching (T-shaped branching) can be realized by leaky wave coupling of the wave propagating in the first and second straight waveguides forming at least one of bending and intersection substantially at the same rate, by means of leaky wave propagation region.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A waveguide element having a waveguide discontinuity comprising:
   first and second straight waveguides propagating a wave forming at least one of a bending junction and an intersection; and
   a quadrilateral leaky wave propagation region establishing a leaky wave coupling of the wave propagating through said first and second straight waveguides at a substantially equal rate.

2. A waveguide element as set forth in claim 1, wherein said first and second straight waveguides are single mode waveguides have center axes extending in longitudinal directions and intersecting at an intersection angle $\theta$ ($0<\theta\leq 90°$) and have effective propagation wavelength $\lambda G$.

3. A waveguide element as set forth in claim 1, wherein said leaky wave propagation region is a region of effective propagation wavelength $\lambda L$ having two edges located close to each other along the longitudinal direction of respective of said first and second straight waveguides so as to establish leaky wave coupling of the wave propagating through said first and second straight waveguides at substantially the same rate.

4. A waveguide element as set forth in claim 1, wherein said first and second straight waveguides and said leaky wave propagation region are in symmetric relationship with respect to a particular plane perpendicular to a plane including said first and second straight waveguides and including a straight line equally dividing a supplementary angle ($\pi-\theta$) of an intersecting angle $\theta$ ($0<\theta\leq 90°$) of said first and second straight waveguides.

5. A waveguide element as set forth in claim 1, wherein a relationship expressed by:

$$\cos(\theta/2) \approx \lambda L/\lambda G$$

between an intersection angle $\theta$ ($0<\theta\leq 90°$) of said first and second straight waveguides, an effective propagation wavelength $\lambda G$ of each of said first and second straight waveguides, and an effective propagation wavelength $\lambda L$ of said leaky wave propagation region.

6. A waveguide element as set forth in claim 1, wherein variation amounts of an effective propagation wavelength $\lambda G$ of each of said first and second straight waveguides and an effective propagation wavelength $\lambda L$ of said leaky wave propagation region are sufficiently small, which variation amounts are caused by leaky wave coupling by respective of said first and second straight waveguides, and said first and second straight waveguides are coupled with each other via said leaky wave propagation region.

7. A waveguide element as set forth in claim 1, which further comprises a bending waveguide having a predetermined curvature radius for smoothly connecting said first and second straight waveguides with each other.

8. A waveguide element as set forth in claim 1, wherein said first and second straight waveguides and said leaky wave propagation region are consistent in number of waves in a direction perpendicular to a plane, on which said first and second straight waveguides and said leaky wave propagation region lie.

9. A waveguide element as set forth in claim 1, which further comprises signal applying means for applying a signal for controlling one of an effective propagation wavelength and an attenuation coefficient of a wave propagating in said leaky wave propagation region.

10. A waveguide element as set forth in claim 9, wherein said signal applying means is constructed to control one of said effective propagation wavelength and said attenuation coefficient of the wave propagated in said leaky wave propagation region by one of application of an electric field, application of an electric current, a irradiation of a light beam, application of a magnetic field, heating, pressurizing.

11. A waveguide element as set forth in claim 1, wherein said leaky wave propagation region includes a region where a leaky wave coupling coefficient between said first and second straight waveguides and said leaky wave propagation region changes monotonically along a longitudinal direction of said first and second straight waveguides.

12. A waveguide element as set forth in claim 1, wherein said leaky wave propagation region includes a region where a leaky wave coupling coefficient between said first and second straight waveguides and said leaky wave propagation region changes non-monotonically along a longitudinal direction of said first and second straight waveguides.

13. A waveguide branch or coupler element having a waveguide discontinuity including at least one of bending and intersection of straight waveguides propagating a wave for branch or couplersaid wave, comprising:
   first, second and third straight waveguide forming at least one of said bending and intersection;
   a first leaky wave propagation region establishing a leaky wave coupling of said wave propagating through respective of said first and second straight waveguides at substantially the same rate; and a second leaky wave propagation region establishing a leaky wave coupling of said wave propagating through respective of said first and third straight waveguides at substantially the same rate.

14. A waveguide branch or coupler element as set forth in claim 13, wherein said first, second and third straight waveguides have mutually the same cross-sectional structure and are single mode waveguide of effective propagation wavelength of λG.

15. A waveguide branch or coupler element as set forth in claim 13, wherein center axes of said first and second straight waveguides are extended in the longitudinal direction for at least intersecting at an intersection angle θ (0<θ≦90°), and center axes of said first and third straight waveguides are extended in the longitudinal direction for at least intersecting at an intersection angle θ (0<θ≦90°).

16. A waveguide branch or coupler element as set forth in claim 13, wherein each of said first and second leaky wave propagation regions is a region of effective propagation wavelength λL having two edges located close to each other along the longitudinal directions of respective of said first and second straight waveguides and the longitudinal directions of respective of said first and third straight waveguides so[]as to establish leaky wave coupling of the wave propagating through said first and second straight waveguides and through said first and third straight waveguides at substantially the same rate.

17. A waveguide branch or coupler element as set forth in claim 13, wherein.respective of said first, second and third straight waveguides and respective of said first and second leaky wave propagation regions perpendicular to a plane including said first and second straight waveguides, said first and second straight waveguides and said first leaky wave propagation region are in a symmetrical relationship about a particular plane including a straight line equally dividing a supplementary angle (π−θ) of an intersection angle θ (0<θ≦90°) between said first and second straight waveguides; and said first and third straight waveguides and said second leaky wave propagation region are perpendicular to a plane including said first and third straight waveguides and in a symmetrical relationship about a pairticular plane including astraight line equally dividing a supplementary angle (π−θ) of an intersection angle θ between said first and third straight waveguides.

18. A waveguide branch or coupler element as set forth in claim 13, wherein a relationship expressed by:

$$\cos(\theta/2) = \lambda L/\lambda G$$

between an intersection angle θ (0<θ≦90°) of said first and second straight waveguides, the intersection angle θ of said first and third straight waveguides, an effective propagation wavelength λG of each of said first, second and third straight waveguides, and an effective propagation wavelength λL of said first and second leaky wave propagation regions.

19. A waveguide branch or coupler element as set forth in claim 13, wherein said first and second straight waveguides are mutually coupled via a first leaky wave propagation region and said first and third straight waveguides are mutually coupled via a second leaky wave propagation region.

20. A waveguide branch or coupler element as set forth in claim 13, which further comprises bending waveguides of predetermined curvature radius for smoothly connecting said first and second straight waveguides and smoothly connecting said first and third straight waveguides.

21. A waveguide branch or coupler element as set forth in claim 13, wherein said first, second and third straight waveguides and said first and second leaky wave propagation regions are consistent in number of waves in perpendicular direction to a plane including said first, second and third straight waveguides and said first and second leaky wave propagation regions.

22. A waveguide branch or coupler element as set forth in claim 13, which includes first and second signal applying means for applying signals for controlling one of effective propagation wavelength and attenuation coefficient of wave propagating through said first and second leaky wave propagation regions to said first and second leaky wave propagation regions.

23. A waveguide branch or coupler element as set forth in claim 22, wherein said first and second signal applying means are constructed to control one of said effective propagation wavelength and said attenuation coefficient of the wave propagated in said leaky wave propagation region by one of application of an electric field, application of an electric current, a irradiation of a light beam, application of a magnetic field, heating, pressurizing.

24. A waveguide branch or coupler element as set forth in claim 13, wherein said first leaky wave propagation region includes a region where a leaky wave coupling coefficient between said first and second straight waveguides and said first leaky wave propagation region varies sequentially along longitudinal direction of said first and second straight waveguides, and said second leaky wave propagation region includes a region where a leaky wave coupling coefficient between said first and third straight waveguides and said first leaky wave propagation region varies sequentially along longitudinal direction of said first and third straight waveguides.

25. A waveguide branch or coupler element as set forth in claim 13, wherein said first leaky wave propagation region includes a region where a leaky wave coupling coefficient between said first and second straight waveguides and said first leaky wave propagation region varies non-sequentially along longitudinal direction of said first and second straight waveguides, and said seeond leaky wave propagation region includes a region where a leaky wave coupling coefficient between said first and third straight waveguides and said first leaky wave propagation region varies non-sequentially along longitudinal direction of said first and third straight waveguides.

26. A waveguide branch or coupler element as set forth in claim 13, wherein said first leaky wave propagation region includes a region where a leaky wave coupling coefficient between said first and second straight waveguides and said first leaky wave propagation region varies sequentially along longitudinal direction of said first and second straight waveguides, and said second leaky wave propagation region includes a region where a leaky wave coupling coefficient between said first and third straight waveguides and said first leaky wave propagation region varies non-sequentially along longitudinal direction of said first and third straight waveguides.

27. A waveguide branch or coupler element as set forth in claim 13, wherein said first leaky wave propagation region includes a region where a leaky wave coupling coefficient between said first and second straight waveguides and said first leaky wave propagation region varies non-sequentially along longitudinal direction of said first and second straight waveguides, and said second leaky wave propagation region includes a region where a leaky wave coupling coefficient between said first and third straight waveguides and said first leaky wave propagation region varies sequentially along longitudinal direction of said first and third straight waveguides.

28. A waveguide integrated circuit comprising a waveguide element having a waveguide discontinuity integrated on a substrate, said waveguide element comprising:

first and second straight waveguides propagating a wave forming at least one of a bending junction and an intersection; and a quadrilateral leaky wave propagation region establishing a leaky wave coupling of the wave propagating through said first and second straight waveguides at a substantially equal rate.

29. A waveguide integrated circuit as set forth in claim 28, wherein said first and second straight waveguides are single mode waveguides have center axes extending in longitudinal directions and intersecting at an intersection angle θ (0<θ≦90°) and have effective propagation wavelength λG.

30. A waveguide integrated circuit as set forth in claim 28, wherein said leaky wave propagation region is a region of effective propagation wavelength λL having two edges located close to each other along the longitudinal direction of respective of said first and second straight waveguides so as to establish leaky wave coupling of the wave propagating through said first and second straight waveguides at substantially the same rate.

31. A waveguide integrated circuit as set forth in claim 28, wherein said first and second straight waveguides and said leaky wave propagation region are in symmetric relationship with respect to a particular plane perpendicular to a plane including said first and second straight waveguides and including a straight line equally dividing a supplementary angle (π−θ) of an intersecting angle θ (0<θ≦90°) of said first and second straight waveguides.

32. A waveguide integrated circuit as set forth in claim 28, wherein a relationship expressed by:

$$\cos(\theta/2) \approx \lambda L/\lambda G$$

between an intersection angle θ (0<θ≦90°) of said first and second straight waveguides, an effective propagation wavelength λG of each of said first and second straight waveguides, and an effective propagation wavelength λL of said leaky wave propagation region.

33. A waveguide integrated circuit as set forth in claim 28, wherein variation amounts of an effective propagation wavelength λG of each of said first and second straight waveguides and an effective propagation wavelength λL of said leaky wave propagation region are sufficiently small, which variation amounts are caused by leaky wave coupling by respective of said first and second straight waveguides, and said first and second straight waveguides are coupled with each other via said leaky wave propagation region.

34. A waveguide integrated circuit as set forth in claim 28, which further comprises a bending waveguide having a predetermined curvature radius for smoothly connecting said first and second straight waveguides with each other.

35. A waveguide integrated circuit as set forth in claim 28, wherein said first and second straight waveguides and said leaky wave propagation region are consistent in number of waves in a direction perpendicular to a plane, on which said first and second straight waveguides and said leaky wave propagation region lie.

36. A waveguide integrated circuit as set forth in claim 28, which further comprises signal applying means for applying a signal for controlling one of an effective propagation wavelength and an attenuation coefficient of a wave propagating in said leaky wave propagation region.

37. A waveguide integrated circuit as set forth in claim 36, wherein said signal applying means is constructed to control one of said effective propagation wavelength and said attenuation coefficient of the wave propagated in said leaky wave propagation region by one of application of an electric field, application of an electric current, a irradiation of a light beam, application of a magnetic field, heating, pressurizing.

38. A waveguide integrated circuit as set forth in claim 28, wherein said leaky wave propagation region includes a region where a leaky wave coupling coefficient between said first and second straight waveguides and said leaky wave propagation region changes monotonically along a longitudinal direction of said first and second straight waveguides.

39. A waveguide integrated circuit as set forth in claim 28, wherein said leaky wave propagation region includes a region where a leaky wave coupling coefficient between said first and second straight waveguides and said leaky wave propagation region changes non-monotonically along a longitudinal direction of said first and second straight waveguides.

40. A waveguide element having a waveguide discontinuity comprising:

first and second straight waveguides propagating a de Broglie wave of an electron forming at least one of a bending junction and an intersection; and a quadrilateral leaky wave propagation region establishing a leaky wave coupling of the wave propagating through said first and second straight waveguides at a substantially equal rate.

41. A waveguide element as set forth in claim 40, wherein said first and second straight waveguides are single mode waveguides have center axes extending in longitudinal directions and intersecting at an intersection angle θ (0<θ≦90°) and have effective propagation wavelength λG.

42. A waveguide element as set forth in claim 40, wherein said leaky wave propagation region is a region of effective propagation wavelength λL having two edges located close to each other along the longitudinal direction of respective of said first and second straight waveguides so as to establish leaky wave coupling of the wave propagating through said first and second straight waveguides at substantially the same rate.

43. A waveguide element as set forth in claim 40, wherein said first and second straight waveguides and said leaky wave propagation region are in symmetric relationship with respect to a particular plane perpendicular to a plane including said first and second straight waveguides and including a straight line equally dividing a supplementary angle (π−θ) of an intersecting angle θ (0<θ≦90°) of said first and second straight waveguides.

44. A waveguide element as set forth in claim 40, wherein a relationship expressed by:

$$\cos(\theta/2) \approx \lambda L/\lambda G$$

between an intersection angle θ (0<θ≦90°) of said first and second straight waveguides, an effective propagation wavelength λG of each of said first and second straight waveguides, and an effective propagation wavelength λL of said leaky wave propagation region.

45. A waveguide element as set forth in claim 40, wherein variation amounts of an effective propagation wavelength λG of each of said first and second straight waveguides and an effective propagation wavelength λL of said leaky wave propagation region are sufficiently small, which variation amounts are caused by leaky wave coupling by respective of said first and second straight waveguides, and said first and second straight waveguides are coupled with each other via said leaky wave propagation region.

46. A waveguide element as set forth in claim 40, which further comprises a bending waveguide having a predetermined curvature radius for smoothly connecting said first and second straight waveguides with each other.

47. A waveguide element as set forth in claim 40, wherein said first and second straight waveguides and said leaky wave propagation region are consistent in number of waves in a direction perpendicular to a plane, on which said first and second straight waveguides and said leaky wave propagation region lie.

48. A waveguide element as set forth in claim 40, which further comprises signal applying means for applying a signal for controlling one of an effective propagation wavelength and an attenuation coefficient of a wave propagating in said leaky wave propagation region.

49. A waveguide element as set forth in claim 48, wherein said signal applying means is constructed to control one of said effective propagation wavelength and said attenuation coefficient of the wave propagated in said leaky wave propagation region by one of application of an electric field, application of an electric current, a irradiation of a light beam, application of a magnetic field, heating, pressurizing.

50. A waveguide element as set forth in claim 40, wherein said leaky wave propagation region includes a region where a leaky wave coupling coefficient between said first and second straight waveguides and said leaky wave propagation region changes monotonically along a longitudinal direction of said first and second straight waveguides.

51. A waveguide element as set forth in claim 40, wherein said leaky wave propagation region includes a region where a leaky wave coupling coefficient between said first and second straight waveguides and said leaky wave propagation region changes non-monotonically along a longitudinal direction of said first and second straight waveguides.

52. A waveguide branch or coupler element having a waveguide discontinuity including at least one of bending and intersection of straight waveguides propagating a general wave including an electromagnetic wave, such as an extremely high frequency wave, a light and the like or a de Broglie wave of electron or the like, for branch or coupler-said wave, comprising:
  first, second and third straight waveguide forming at least one of said bending and intersection;
  a first leaky wave propagation region establishing a leaky wave coupling of said wave propagating through respective of said first and second straight waveguides at substantially the same rate; and
  a second leaky wave propagation region establishing a leaky wave coupling of said wave propagating through respective of said first and third straight waveguides at substantially the same rate.

53. A waveguide branch or coupler element as set forth in claim 52, wherein said first, second and third straight waveguides have mutually the same cross-sectional structure and are single mode waveguide of effective propagation wavelength of λG.

54. A waveguide branch or coupler element as set forth in claim 52, wherein center axes of said first and second straight waveguides are extended in the longitudinal direction for at least intersecting at an intersection angle θ (0<θ≦90°), and center axes of said first and third straight waveguides are extended in the longitudinal direction for at least intersecting at an intersection angle θ (0<θ≦90°).

55. A waveguide branch or coupler element as set forth in claim 52, wherein each of said first and second leaky wave propagation regions is a region of effective propagation wavelength λL having two edges located close to each other along the longitudinal directions of respective of said first and second straight waveguides and the longitudinal directions of respective of said first and third straight waveguides so as to establish leaky wave coupling of the wave propagating through said first and second straight waveguides and through said first and third straight waveguides at substantially the same rate.

56. A waveguide branch or coupler element as set forth in claim 52, wherein respective of said first, second and third straight waveguides and respective of said first and second leaky wave propagation regions perpendicular to a plane including said first and second straight waveguides,
  said first and second straight waveguides and said first leaky wave propagation region are in a symmetrical relationship about a particular plane including a straight line equally dividing a supplementary angle (π−θ) of an intersection angle θ (0<θ≦90°) between said first and second straight waveguides; and
  said first and third straight waveguides and said second leaky wave propagation region are perpendicular to a plane including said first and third straight waveguides and in a symmetrical relationship about a particular plane including a straight line equally dividing a supplementary angle (π−θ) of an intersection angle θ between said first and third straight waveguides.

57. A waveguide branch or coupler element as set forth in claim 52, wherein a relationship expressed by:

$$\cos(\theta/2) = \lambda L/\lambda G$$

between an intersection angle θ (0<θ≦90°) of said first and second straight waveguides, the intersection angle θ of said first and third straight waveguides, an effective propagation wavelength λG of each of said first, second and third straight waveguides, and an effective propagation wavelength λL of said first and second leaky wave propagation regions.

58. A waveguide branch or coupler element as set forth in claim 52, wherein said first and second straight waveguides are mutually coupled via a first leaky wave propagation region and said first and third straight waveguides are mutually coupled via a second leaky wave propagation region.

59. A waveguide branch or coupler element as set forth in claim 52, which further comprises bending waveguides of predetermined curvature radius for smoothly connecting said first and second straight waveguides and smoothly connecting said first and third straight waveguides.

60. A waveguide branch or coupler element as set forth in claim 52, wherein said first, second and third straight waveguides and said first and second leaky wave propagation regions are consistent in number of waves in perpendicular direction to a plane including said first, second and third straight waveguides and said first and second leaky wave propagation regions.

61. A waveguide branch or coupler element as set forth in claim 52, which includes first and second signal applying means for applying signals for controlling one of effective propagation wavelength and attenuation coefficient of wave propagating through said first and second leaky wave propagation regions to said first and second leaky wave propagation regions.

62. A waveguide branch or coupler element as set forth in claim 61, wherein said first and second signal applying means are constructed to control one of said effective propagation wavelength and said attenuation coefficient of the wave propagated in said leaky wave propagation region by one of application of an electric field, application of an electric current, a irradiation of a light beam, application of a magnetic field, heating, pressurizing.

63. A waveguide branch or coupler element as set forth in claim 52, wherein said first leaky wave propagation region includes a region where a leaky wave coupling coefficient between said first and second straight waveguides and said first leaky wave propagation region varies sequentially along longitudinal direction of said first and second straight waveguides, and said second leaky wave propagation region includes a region where a leaky wave coupling coefficient between said first and third straight waveguides and said first leaky wave propagation region varies sequentially along longitudinal direction of said first and third straight waveguides.

64. A waveguide branch or coupler element as set forth in claim 52, wherein said first leaky wave propagation region includes a region where a leaky wave coupling coefficient between said first and second straight waveguides and said first leaky wave propagation region varies non-sequentially along longitudinal direction of said first and second straight waveguides, and said second leaky wave propagation region includes a region where a leaky wave coupling coefficient between said first and third straight waveguides and said first leaky wage propagation region varies non-sequentially along longitudinal direction of said first and third straight waveguides.

65. A waveguide branch or coupler element as set forth in claim 52, wherein said first leaky wave propagation region includes a region where a leaky wave coupling coefficient between said first and second straight waveguides and said first leaky wave propagation region varies sequentially along longitudinal direction of said first and second straight waveguides, and said second leaky wave propagation region includes a region where a leaky wave coupling coefficient between said first and third straight waveguides and said first leaky wave propagation region varies non-sequentially along longitudinal direction of said first and third straight waveguides.

66. A waveguide branch or coupler as set forth in claim 52, wherein said first leaky wave propagation region includes a region where a leaky wave coupling coefficient between said first and second straight waveguides and said first leaky wave propagation region varies non-sequentially along longitudinal direction of said first and second straight waveguides, and said second leaky wave propagation region includes a region where a leaky wave coupling coefficient between said first and third straight waveguides and said first leaky wave propagation region varies sequentially along longitudinal direction of said first and third straight waveguides.

67. A waveguide integrated circuit comprising a waveguide element having a waveguide discontinuity, said waveguide element comprising:

first and second straight waveguides propagating a de Broglie wave of an electron forming at least one of a bending junction and an intersection; and a quadrilateral leaky wave propagation region establishing a leaky wave coupling of the wave propagating through said first and second straight waveguides at substantially equal rate.

68. A waveguide integrated circuit as set forth in claim 67, wherein said first and second straight waveguides are single mode waveguides have center axes extending in longitudinal directions and intersecting at an intersection angle $\theta$ ($0<\theta\leq 90°$) and have effective propagation wavelength $\lambda G$.

69. A waveguide integrated circuit as set forth in claim 67, wherein said leaky wave propagation region is a region of effective propagation wavelength $\lambda L$ having two edges located close to each other along the longitudinal direction of respective of said first and second straight waveguides so as to establish leaky wave coupling of the wave propagating through said first and second straight waveguides at substantially the same rate.

70. A waveguide integrated circuit as set forth in claim 67, wherein said first and second straight waveguides and said leaky wave propagation region are in symmetric relationship with respect to a particular plane perpendicular to a plane including said first and second straight waveguides and including a straight line equally dividing a supplementary angle $(\pi-\theta)$ of an intersecting angle $\theta$ ($0<\theta\leq 90°$) of said first and second straight waveguides.

71. A waveguide integrated circuit as set forth in claim 67, wherein a relationship expressed by:

$$\cos(\theta/2)\approx \lambda L/\lambda G$$

between an intersection angle $\theta$ ($0<\theta\leq 90°$) of said first and second straight waveguides, an effective propagation wavelength $\lambda G$ of each of said first and second straight waveguides, and an effective propagation wavelength $\lambda L$ of said leaky wave propagation region.

72. A waveguide integrated circuit as set forth in claim 67, wherein variation amounts of an effective propagation wavelength $\lambda G$ of each of said first and second straight waveguides and an effective propagation wavelength $\lambda L$ of said leaky wave propagation region are sufficiently small, which variation amounts are caused by leaky wave coupling by respective of said first and second straight waveguides, and said first and second straight waveguides are coupled with each other via said leaky wave propagation region.

73. A waveguide integrated circuit as set forth in claim 67, which further comprises a bending waveguide having a predetermined curvature radius for smoothly connecting said first and second straight waveguides with each other.

74. A waveguide integrated circuit as set forth in claim 67, wherein said first and second straight waveguides and said leaky wave propagation region are consistent in number of waves in a direction perpendicular to a plane, on which said first and second straight waveguides and said leaky wave propagation region lie.

75. A waveguide integrated circuit as set forth in claim 67, which further comprises signal applying means for applying a signal for controlling one of an effective propagation wavelength-and an attenuation coefficient of a wave propagating in said leaky wave propagation region.

76. A waveguide integrated circuit as set forth in claim 75, wherein said signal applying means is constructed to control one of said effective propagation wavelength and said attenuation coefficient of the wave propagated in said leaky wave propagation region by one of application of an electric field, application of an electric current, a irradiation of a light beam, application of a magnetic field, heating, pressurizing.

77. A waveguide integrated circuit as set forth in claim 67, wherein said leaky wave propagation region includes a region where a leaky wave coupling coefficient between said first and second straight waveguides and said leaky wave propagation region changes monotonically along a longitudinal direction of said first and second straight waveguides.

78. A waveguide integrated circuit as set forth in claim 67, wherein said leaky wave propagation region includes a region where a leaky wave coupling coefficient between said first and second straight waveguides and said leaky wave propagation region changes non-monotonically along a longitudinal direction of said first and second straight waveguides.

\* \* \* \* \*